US012174438B2

(12) United States Patent
Du et al.

(10) Patent No.: US 12,174,438 B2
(45) Date of Patent: Dec. 24, 2024

(54) OPTICAL MODULE WITH STRUCTURED PROTECTIVE COVER

(71) Applicant: HISENSE BROADBAND MULTIMEDIA TECHNOLOGIES CO., LTD., Shandong (CN)

(72) Inventors: Guangchao Du, Shandong (CN); Yongzheng Tang, Shandong (CN); Tao Wu, Shandong (CN); Jianwei Mu, Shandong (CN); Shaoshuai Sui, Shandong (CN); Jihong Han, Shandong (CN); Sitao Chen, Shandong (CN); Qian Shao, Shandong (CN); Bangyu Yu, Shandong (CN); Benzheng Dong, Shandong (CN); Xiangxun Sun, Shandong (CN); Fabu Xu, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 0 days.

(21) Appl. No.: 18/472,638

(22) Filed: Sep. 22, 2023

(65) Prior Publication Data
US 2024/0012212 A1 Jan. 11, 2024

Related U.S. Application Data

(63) Continuation of application No. 17/235,367, filed on Apr. 20, 2021, now Pat. No. 11,828,991, which is a (Continued)

(30) Foreign Application Priority Data

Mar. 15, 2019 (CN) .......... 201910199334.9
Mar. 15, 2019 (CN) .......... 201910199347.6
(Continued)

(51) Int. Cl.
*G02B 6/42* (2006.01)
*H04B 10/50* (2013.01)

(52) U.S. Cl.
CPC ......... *G02B 6/4215* (2013.01); *G02B 6/4206* (2013.01); *G02B 6/4266* (2013.01); *H04B 10/503* (2013.01)

(58) Field of Classification Search
None
See application file for complete search history.

(56) References Cited

U.S. PATENT DOCUMENTS 6,075,914 A 6/2000 Yeandle
7,452,140 B2 11/2008 Ito et al.
(Continued)

FOREIGN PATENT DOCUMENTS

CN 1285926 A 2/2001
CN 201887329 U 6/2011
(Continued)

OTHER PUBLICATIONS

International Search Report and Written Opinion dated Mar. 20, 2020 in corresponding International Application No. PCT/CN2019/127211, translated, 19 pages.
(Continued)

*Primary Examiner* — Andrew Jordan
(74) *Attorney, Agent, or Firm* — MH2 TECHNOLOGY LAW GROUP LLP

(57) ABSTRACT

An optical module includes a shell, a circuit board, a base, a laser assembly, a silicon optical chip and a protective cover. The laser assembly and the silicon optical chip are located on the base. The protective cover covers on the circuit board. The laser assembly and a wiring region of the laser assembly and/or the silicon optical chip and a wiring region of the silicon optical chip are encapsulated between
(Continued)

the protective cover and the circuit board. The shell includes at least one heat conduction column, the at least one heat conduction column is disposed on an inner wall of the shell and is in thermal conductive connection with the laser assembly and/or the silicon optical chip. The protective cover includes at least one escape opening that allow the at least one heat conduction column to pass and enter an inside of the protective cover.

20 Claims, 13 Drawing Sheets

Related U.S. Application Data continuation-in-part of application No. PCT/CN2020/133868, filed on Dec. 4, 2020, and a continuation-in-part of application No. PCT/CN2019/127211, filed on Dec. 20, 2019.

(30) Foreign Application Priority Data

Mar. 15, 2019 (CN) .......................... 201910199953.8
Apr. 21, 2020 (CN) .......................... 202010317005.2

(56) References Cited

U.S. PATENT DOCUMENTS

| | | | |
|---|---|---|---|
| 7,490,996 B2 | 2/2009 | Sommer | |
| 9,995,892 B2 | 6/2018 | Xu | |
| 10,222,474 B1 | 3/2019 | Raring et al. | |
| 11,828,991 B2* | 11/2023 | Du | G02B 6/4215 |
| 11,927,818 B2* | 3/2024 | Zheng | H01R 13/6658 |
| 2003/0156798 A1 | 8/2003 | Cull | |
| 2004/0218873 A1 | 11/2004 | Nagashima et al. | |
| 2011/0280528 A1 | 11/2011 | Wu | |
| 2012/0195556 A1 | 8/2012 | Wang et al. | |
| 2014/0205248 A1 | 7/2014 | Yamada | |
| 2015/0078740 A1 | 3/2015 | Sipes, Jr. et al. | |
| 2015/0093069 A1 | 4/2015 | Nakamura | |
| 2015/0185426 A1 | 7/2015 | Miao et al. | |
| 2015/0270901 A1 | 9/2015 | Peng et al. | |
| 2016/0077287 A1 | 3/2016 | Isenhour et al. | |
| 2016/0112137 A1 | 4/2016 | Pfnuer et al. | |
| 2016/0246018 A1 | 8/2016 | Pinguet et al. | |
| 2017/0227721 A1 | 8/2017 | Yu et al. | |
| 2018/0331486 A1 | 11/2018 | Li et al. | |
| 2018/0359033 A1 | 12/2018 | Xu et al. | |
| 2020/0295528 A1 | 9/2020 | Du et al. | |
| 2021/0239922 A1* | 8/2021 | Du | H04B 10/503 |
| 2021/0325617 A1* | 10/2021 | Zheng | H05K 1/144 |
| 2021/0356683 A1* | 11/2021 | Zheng | H01S 5/0239 |
| 2022/0006253 A1 | 1/2022 | Li et al. | |
| 2022/0019035 A1 | 1/2022 | Li et al. | |
| 2022/0146763 A1 | 5/2022 | Shao et al. | |
| 2022/0404563 A1 | 12/2022 | Liu et al. | |
| 2023/0116287 A1* | 4/2023 | Zheng | G02B 6/4278 385/33 |
| 2023/0194808 A1 | 6/2023 | Hu et al. | |
| 2024/0012210 A1* | 1/2024 | Du | G02B 6/4215 |
| 2024/0012211 A1* | 1/2024 | Du | G02B 6/421 |
| 2024/0012212 A1* | 1/2024 | Du | G02B 6/4269 |
| 2024/0019650 A1 | 1/2024 | Zheng et al. | |

FOREIGN PATENT DOCUMENTS

| | | |
|---|---|---|
| CN | 202103033 U | 1/2012 |
| CN | 104641273 A | 5/2015 |
| CN | 105259623 A | 1/2016 |
| CN | 204966954 U | 1/2016 |
| CN | 105305231 A | 2/2016 |
| CN | 106019496 A | 10/2016 |
| CN | 106207743 A | 12/2016 |
| CN | 106816808 A | 6/2017 |
| CN | 107045197 A | 8/2017 |
| CN | 206546452 U | 10/2017 |
| CN | 107479152 A | 12/2017 |
| CN | 107688217 A | 2/2018 |
| CN | 107942450 A | 4/2018 |
| CN | 107942451 A | 4/2018 |
| CN | 108490553 A | 9/2018 |
| CN | 108508551 A | 9/2018 |
| CN | 108548102 A | 9/2018 |
| CN | 108882523 A | 11/2018 |
| CN | 208060764 U | 11/2018 |
| CN | 109343180 A | 2/2019 |
| CN | 109407231 A | 3/2019 |
| CN | 110376690 A | 10/2019 |
| CN | 110388576 A | 10/2019 |
| CN | 110488433 A | 11/2019 |
| CN | 110888206 A | 3/2020 |
| CN | 110954998 A | 4/2020 |
| CN | 110971304 A | 4/2020 |
| CN | 111338039 A | 6/2020 |
| JP | H11274654 A | 10/1999 |
| JP | 2015070123 A | 4/2015 |
| WO | 2013039209 A1 | 3/2013 |

OTHER PUBLICATIONS

International Search Report and Written Opinion dated Mar. 3, 2021 in corresponding International Application No. PCT/CN2020/133868, translated, 19 pages.
Chinese First Office Action dated May 6, 2022 in corresponding Chinese Application No. 201910199334.9, translated, 17 pages.
Chinese Notification to Grant Patent Right for Invention dated Oct. 8, 2022 in corresponding Chinese Application No. 201910199334.9, translated, 9 pages.
Chinese First Office Action dated Feb. 23, 2021 in corresponding Chinese Application No. 201910199347.6, translated, 22 pages.
Chinese Second Office Action dated Jul. 23, 2021 in corresponding Chinese Application No. 201910199347.6, translated, 13 pages.
Chinese Decision of Rejection dated Mar. 2, 2022 in corresponding Chinese Application No. 201910199347.6, translated, 14 pages.
Chinese First Office Action dated Jun. 7, 2021 in corresponding Chinese Application No. 201910199953.8, translated, 17 pages.
Chinese Decision of Rejection dated Mar. 30, 2022 in corresponding Chinese Application No. 201910199953.8, translated, 12 pages.
Chinese First Office Action dated Feb. 3, 2021 in corresponding Chinese Application No. 202010317005.2, translated, 12 pages.
Chinese Second Office Action dated Aug. 13, 2021 in corresponding Chinese Application No. 202010317005.2, translated, 18 pages.
Chinese Notification to Grant Patent Right for Invention dated Nov. 2, 2021 in corresponding Chinese Application No. 202010317005.2, translated, 6 pages.
Non-Final Office Action dated Apr. 19, 2023 in parent U.S. Appl. No. 17/235,367, 26 pages.
Extended European Search Report dated Nov. 17, 2022 in corresponding European Application No. 19920189.8, 8 pages.
Notice of Allowance dated Sep. 6, 2024 in corresponding U.S. Appl. No. 18/472,503, 22 pages.
Notice of Allowance dated Sep. 25, 2024 in corresponding U.S. Appl. No. 18/472,563, 21 pages.

* cited by examiner

OPTICAL MODULE WITH STRUCTURED PROTECTIVE COVER

CROSS-REFERENCE TO RELATED APPLICATIONS

This application is a continuation application of U.S. patent application Ser. No. 17/235,367, filed on Apr. 20, 2021, pending, which is a continuation-in-part of International Application No. PCT/CN2020/133868, with an international filing date of 4 Dec. 2020, and claims priority to Chinese Patent Application No. 202010317005.2, filed 21 Apr. 2020; and this application is a continuation-in-part of International Application No. PCT/CN2019/127211, with an international filing date of 20 Dec. 2019, which claims the priority to Chinese Patent Application No. 201910199334.9, filed 15 Mar. 2019, Chinese Patent Application No. 201910199347.6, filed 15 Mar. 2019, and Chinese Patent Application No. 201910199953.8, filed 15 Mar. 2019. The entire contents of the foregoing applications are hereby incorporated by reference herein.

TECHNICAL FIELD

The present application relates to the field of optical fiber communication, and in particular, to an optical module.

BACKGROUND

Optical communication technology is used in cloud computing, mobile Internet, video conference and other new services and applications. In optical communication, an optical module is a tool for achieving interconversion between an optical signal and an electrical signal, and is one of key components in an optical communication device. At present, the use of a silicon optical chip to achieve the interconversion between the optical signal and the electrical signal has become a mainstream solution adopted by a high-speed optical module.

SUMMARY

Some embodiments of the present disclosure provide an optical module. The optical module includes a shell, a circuit board, a base, a laser assembly, a silicon optical chip and a protective cover.

The circuit board is located within the shell. The base is located on the circuit board or in a through hole of the circuit board. The laser assembly is located on the base, is electrically connected to the circuit board, and is configured to provide light. The silicon optical chip is located on the base, electrically connected to the circuit board and optically connected to the laser assembly, and is configured to receive the light, and modulate the light to form a first optical signal. The protective cover covers on the circuit board. The laser assembly and a wiring region of the laser assembly are encapsulated between the protective cover and the circuit board, and the protective cover is configured to protect electrical connection wires between the laser assembly and the circuit board; and/or, the silicon optical chip and a wiring region of the silicon optical chip are encapsulated between the protective cover and the circuit board, and the protective cover is configured to protect electrical connection wires between the silicon optical chip and the circuit board. The shell includes at least one heat conduction column, the at least one heat conduction column is disposed on an inner wall of the shell and is in thermal conductive connection with the laser assembly and/or the silicon optical chip, and each heat conduction column is configured to conduct the heat inside the shell to the shell. The protective cover includes at least one escape opening that allow the at least one heat conduction column to pass and enter an inside of the protective cover.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of a product, actual processes of a method and actual timings of signals to which the embodiments of the present disclosure relate.

DETAILED DESCRIPTION

Figure 1A:
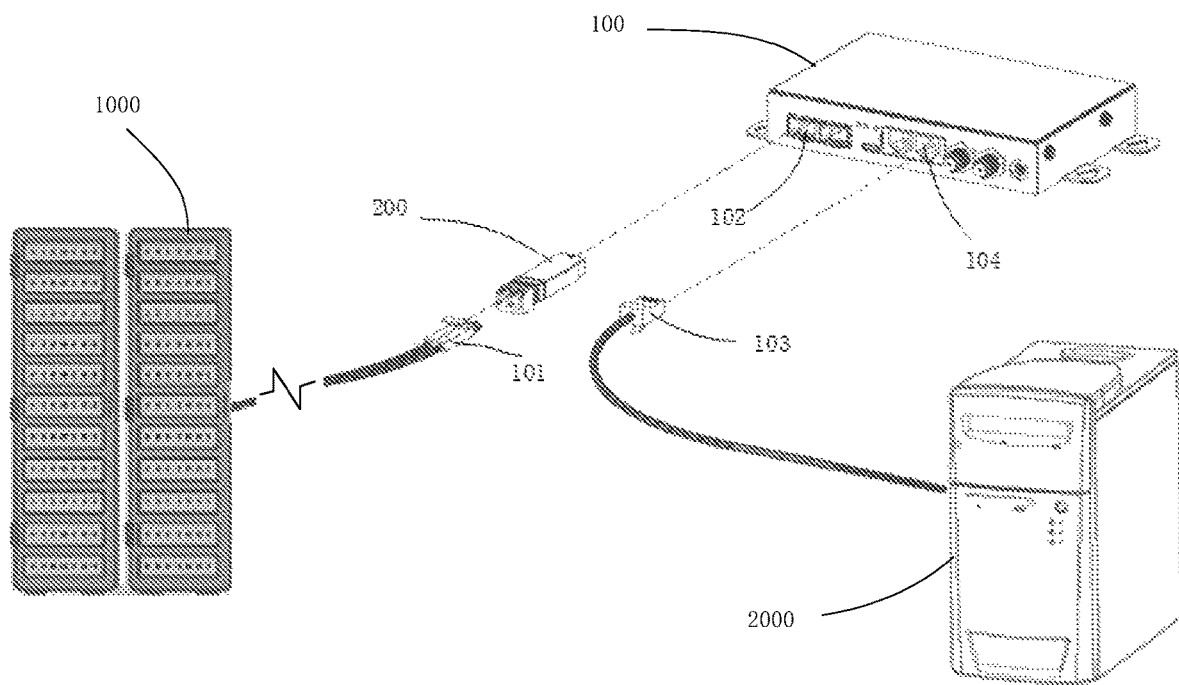
FIG. 1A is a schematic diagram showing a connection relationship of an optical communication system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first", "second" and "third" are used for descriptive purposes only, and are not to be construed as indicating or implying the relative importance or implicitly indicating the number of indicated technical features. Thus, features defined as "first", "second" and "third" may explicitly or implicitly include one or more of the features. In the description of the embodiments of the present disclosure, the term "a plurality of" means two or more unless otherwise specified.

Hereinafter, orientations or positional relationships indicated by the terms "center", "upper", "lower", "front", "rear", "left", "right", "vertical", "horizontal", "top", "bottom", "inner", "outer", etc. are based on orientations or positional relationships shown in the drawings, merely to facilitate and simplify the description of the present disclosure, but not to indicate or imply that the referred devices or elements must have a particular orientation, or must be constructed or operated in a particular orientation. Therefore, these terms cannot be construed as limitations on the present disclosure.

In the description of some embodiments, the terms "connected" and "electrically connected" and their extensions may be used. For example, the term "connected" may be used in the description of some embodiments to indicate that two or more components are in direct physical or electric contact with each other. For another example, the term "electrically connected" may be used in the description of some embodiments to indicate that two or more components are in direct electric contact. However, the term "electrically connected" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

In addition, the use of the phrase "based on" means openness and inclusiveness, since a process, step, calculation or other action that is "based on" one or more of the stated conditions or values may, in practice, be based on additional conditions or values exceeding those stated.

The term "about", "substantially" and "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

In optical communication technology, an optical signal is used to carry information to be transmitted, and the optical signal carrying the information is transmitted to an information processing device such as a computer through an information transmission device such as an optical fiber or an optical waveguide to complete the transmission of the information. Since the optical signal has a characteristic of passive transmission when being transmitted through the optical fiber or the optical waveguide, low-cost and low-loss information transmission may be achieved. In addition, it will be noted that, a signal transmitted by the information transmission device such as the optical fiber or the optical waveguide is an optical signal, while a signal that can be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of interconversion between the optical signal and the electrical signal in the field of optical fiber communication technology. The optical module includes an optical port and an electrical port. The optical port is configured to implement optical communication between the optical module and the information transmission device such as the optical fiber or the optical waveguide. The electrical port is configured to implement electrical connection between the optical module and an optical network terminal (e.g., an optical modem). The electrical connection is mainly to implement power supply, transmission of an I2C signal, transmission of a data signal and grounding. The optical network terminal transmits the electrical signal to the information processing device such as the computer through a network cable or wireless fidelity (Wi-Fi).

Figure 1B:
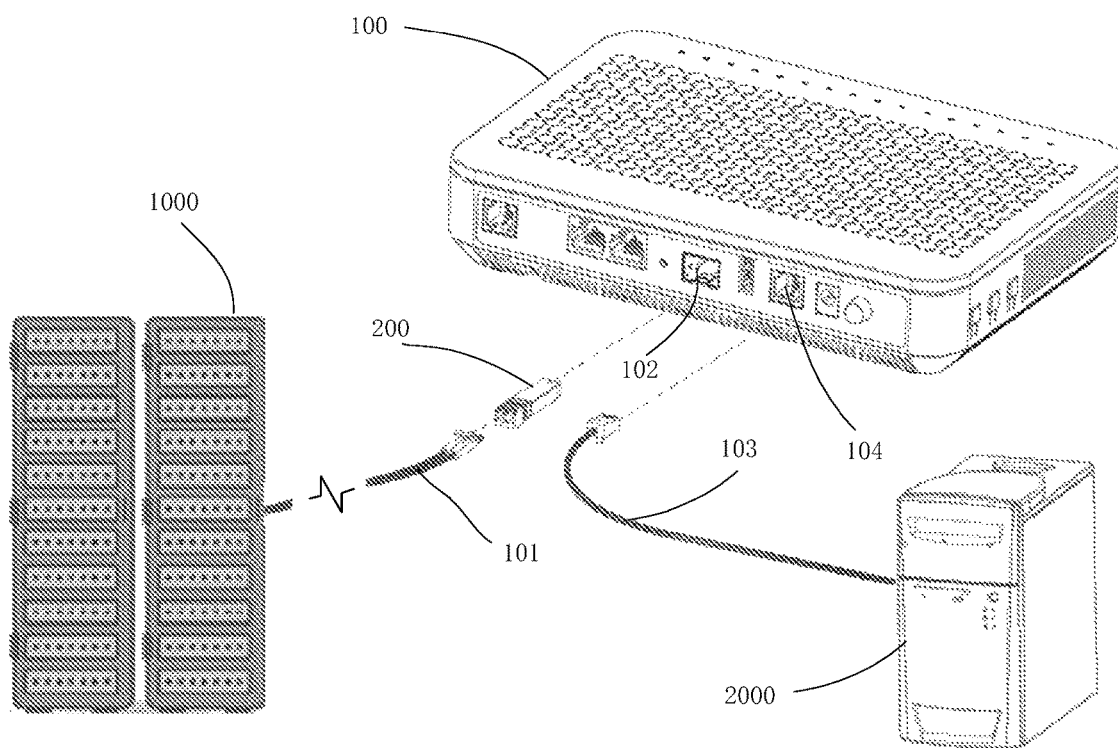
FIG. 1B is a schematic diagram showing a connection relationship of another optical communication system, in accordance with some embodiments.

FIG. 1A is a schematic diagram showing a connection relationship of an optical communication system in accordance with some embodiments, and FIG. 1B is a schematic diagram showing a connection relationship of another optical communication system in accordance with some embodiments. As shown in FIGS. 1A and 1B, the optical communication system mainly includes a remote server 1000, a local information processing device 2000, an optical network terminal 100, an optical module 200, an optical fiber 101, and a network cable 103.

One terminal of the optical fiber 101 is connected to the remote server 1000, and another terminal is connected to the optical module 200. The optical fiber itself may support long-distance signal transmission, such as several-kilometer (6-kilometer to 8-kilometer) signal transmission. Based on this, if a repeater is used, infinite-distance transmission may be achieved theoretically. Therefore, in a typical optical communication system, a distance between the remote server 1000 and the optical module 200 may typically reach several kilometers, tens of kilometers, or hundreds of kilometers.

One terminal of the network cable 103 is connected to the local information processing device 2000, and another terminal is connected to the optical network terminal 100. The local information processing device 2000 is at least one of the followings: a router, a switch, a computer, a mobile phone, a tablet computer, or a television.

A physical distance between the remote server 1000 and the optical network terminal 100 is greater than a physical distance between the local information processing device 2000 and the optical network terminal 100. Connection between the local information processing device 2000 and the remote server 1000 is implemented with the optical fiber 101 and the network cable 103; and connection between the optical fiber 101 and the network cable 103 is implemented with the optical network terminal 100 into which the optical module 200 is inserted.

The optical module 200 has an optical port and an electrical port. The optical port of the optical module 200 is accessed to the optical fiber 101 to establish bidirectional optical signal connection with the optical fiber 101; and the electrical port of the optical module 200 is accessed to the optical network terminal 100 to establish bidirectional electrical signal connection with the optical network terminal 100. Interconversion between the optical signal and the electrical signal is achieved by the optical module 200, so that information connection between the optical fiber 101 and the optical network terminal 100 is established. That is to say, the optical signal from the optical fiber 101 is converted into an electrical signal by the optical module 200 and then input into the optical network terminal 100, and the electrical signal from the optical network terminal 100 is converted into an optical signal by the optical module 200 and then input into the optical fiber 101. Since the optical module 200 is a tool for achieving the interconversion between the optical signal and the electrical signal, and has no function of processing data, the information does not change in the above photoelectric conversion process.

The optical network terminal 100 has an optical module interface 102, and the optical module interface 102 is configured to access the optical module 200, so that the bidirectional electrical signal connection between the optical network terminal 100 and the optical module 200 is established; and the optical network terminal 100 has a network cable interface 104, and the network cable interface 104 is configured to access the network cable 103, so that bidirectional electrical signal connection between the optical network terminal 100 and the network cable 103 is established. That is, connection between the optical module 200 and the network cable 103 is established through the optical network terminal 100. That is to say, the optical network terminal 100 may transmit a signal from the optical module 200 to the network cable 103, and transmit a signal from the network cable 103 to the optical module 200. Therefore, the optical network terminal 100, as a master monitor of the optical module 200, may monitor operation of the optical module 200. FIGS. 1A and 1B show optical network terminals 100 in two different forms. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100, and the network cable 103.

Figure 2:
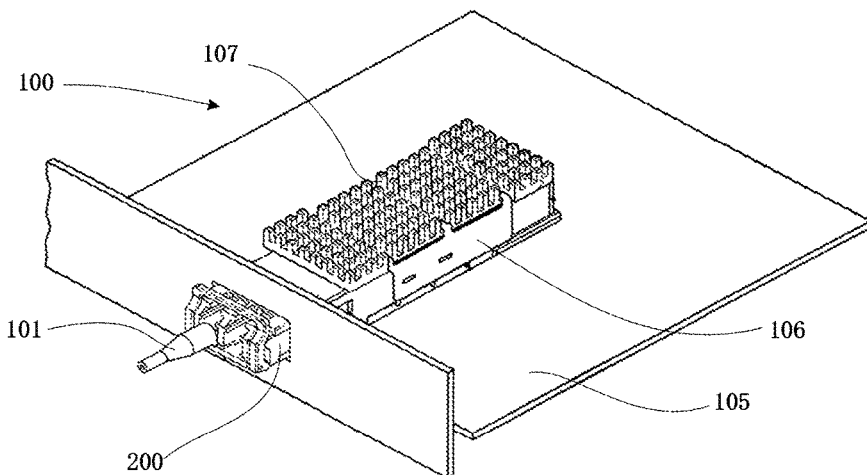
FIG. 2 is a schematic diagram showing a structure of an optical network terminal, in accordance with some embodiments.

FIG. 2 is a schematic diagram showing a structure of an optical network terminal. In order to clearly show a connection relationship between the optical module 200 and the optical network terminal 100, FIG. 2 only shows a structure of the optical network terminal 100 related to the optical module 200. As shown in FIG. 2, the optical network terminal 100 includes a circuit board 105, a cage 106 and a heat sink 107. The cage 106 is disposed on a surface of the circuit board 105, and a cavity enclosed by both of the cage 106 and the circuit board 105 forms the optical module interface 102; the circuit board 105 has an electrical connector, the cage 106 wraps the electrical connector therein, and the electrical connector is configured to access the electrical port of the optical module 200; and the heat sink 107 is disposed on the cage 106, and the heat sink 107 has protruding structures such as fins capable of increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector in the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3A:
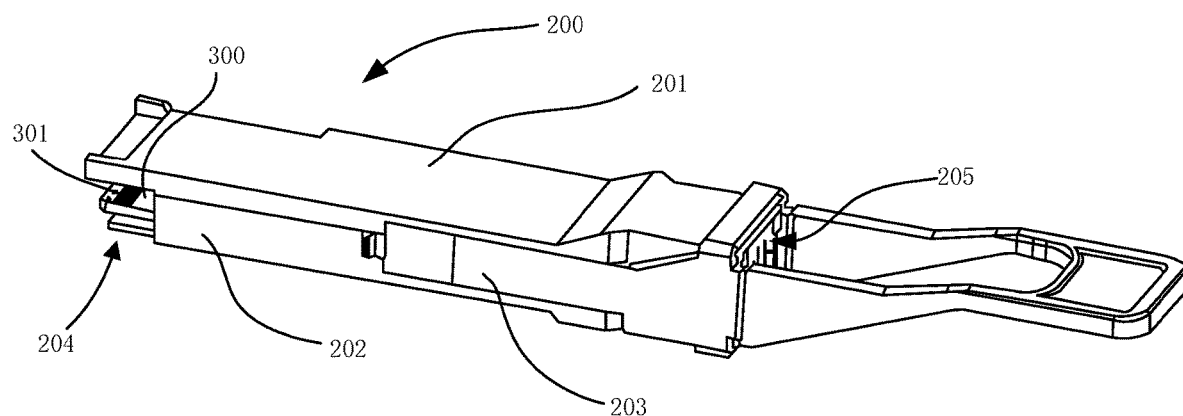
FIG. 3A is a schematic diagram showing a structure of an optical module, in accordance with some embodiments.
Figure 3B:
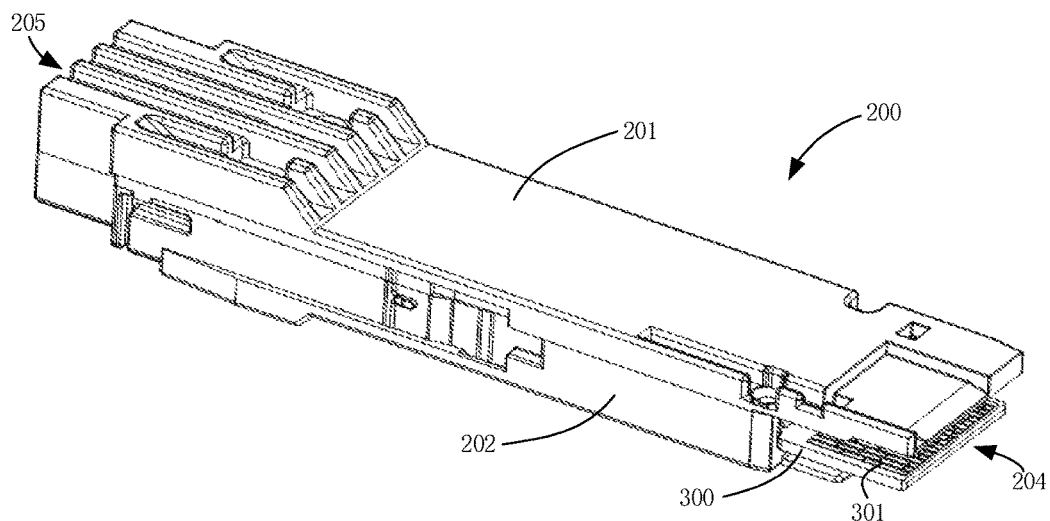
FIG. 3B is a schematic diagram showing a structure of another optical module, in accordance with some embodiments.
Figure 4A:
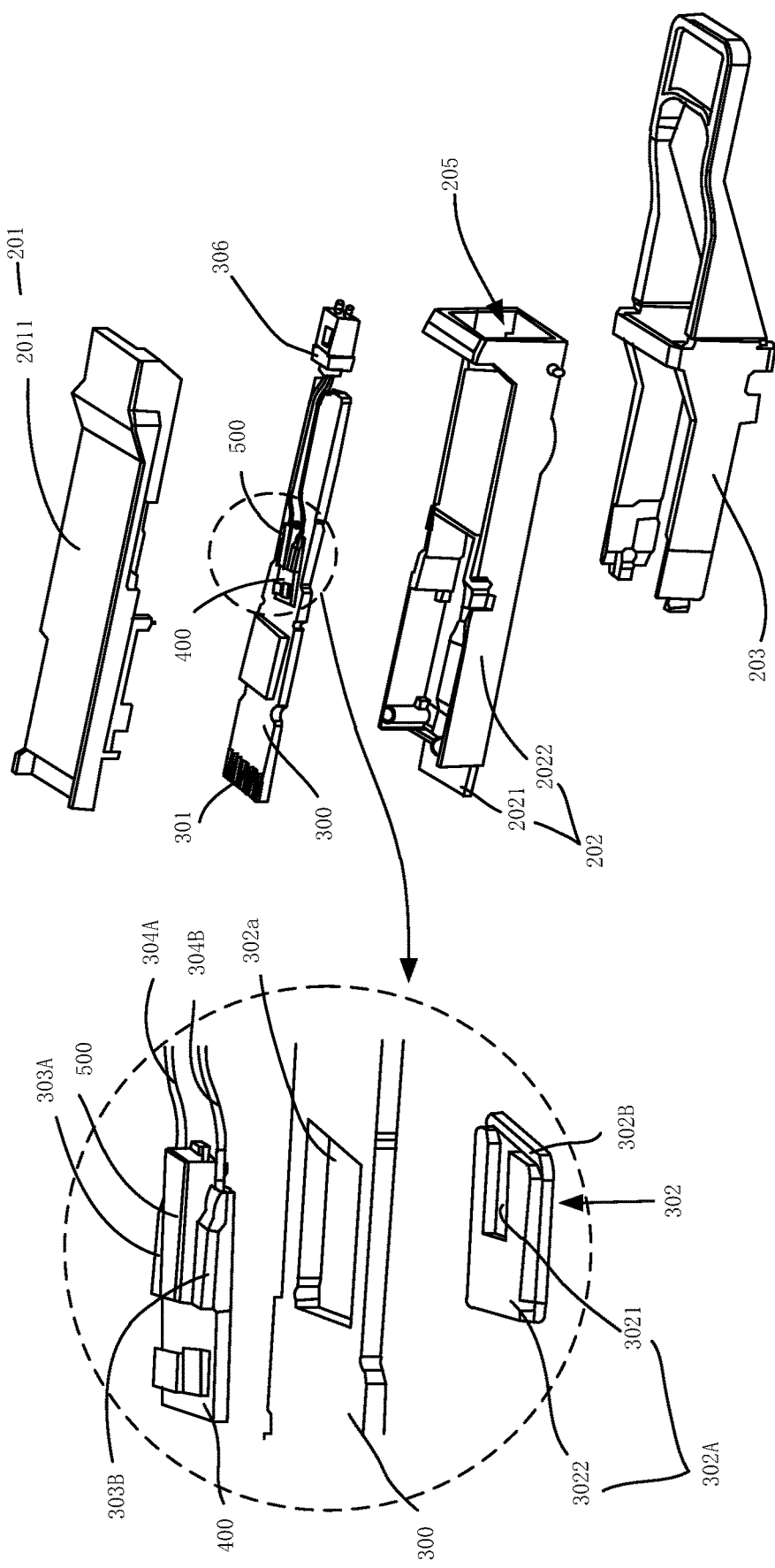
FIG. 4A is a schematic diagram showing an exploded structure of the optical module shown in FIG. 3A.
Figure 4B:
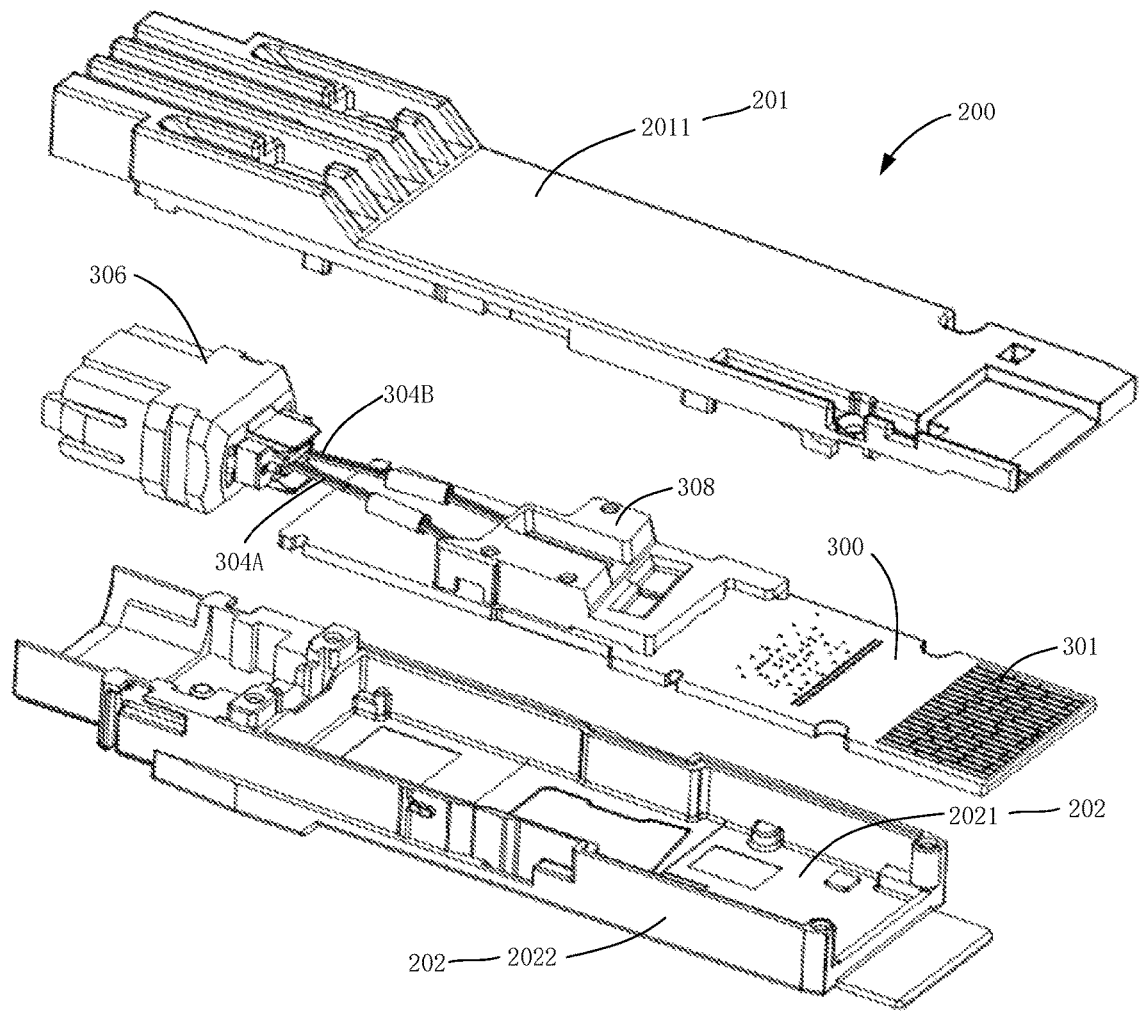
FIG. 4B is a schematic diagram showing an exploded structure of the optical module shown in FIG. 3B.

FIG. 3A is a diagram showing a structure of an optical module in accordance with some embodiments, and FIG. 4A is an exploded view of the optical module shown in FIG. 3A. FIG. 3B is a diagram showing a structure of another optical module in accordance with some embodiments, and FIG. 4B is an exploded view of the optical module shown in FIG. 3B. As shown in FIGS. 3A to 3B and 4A to 4B, the optical module 200 includes an upper shell 201, a lower shell 202, a circuit board 300, a silicon optical chip 400, and a laser assembly 500.

The upper shell 201 and the lower shell 202 form a shell with a wrapping cavity. In some embodiments, the upper shell 201 covers the lower shell 202 to form the wrapping cavity with two openings. The circuit board 300, the silicon optical chip 400 and the laser assembly 500 are located in the wrapping cavity, and an outer contour of the wrapping cavity is generally in a rectangular parallelepiped shape.

In some embodiments, as shown in FIGS. 4A and 4B, the upper shell 201 includes a top plate 2011, the lower shell 202 includes a bottom plate 2021 and two lower side plates 2022 located on both sides of the bottom plate 2021 and disposed perpendicular to the bottom plate 2021, and the top plate 2011 covers the two lower side plates 2022 of the lower shell 202 to form the wrapping cavity. In some other embodiments, the upper shell 201 includes a top plate and two upper side plates located on both sides of the top plate and disposed perpendicular to the top plate; and the lower shell 202 includes a bottom plate and two lower side plates located on both sides of the bottom plate and disposed perpendicular to the bottom plate, and the two upper side plates are combined with the two lower side plates respectively to achieve that the upper shell 201 covers the lower shell 202.

The two openings may be openings 204 and 205 at both ends of the shell which are in a same direction, or may be two openings of the shell which are in different directions. The same direction refers to a direction in which a connection line between the openings 204 and 205 is located, and this direction is the same as a longitudinal direction of the optical module 200. The different directions mean that the direction in which the connection line between the openings 204 and 205 is located is not the same as the longitudinal direction of the optical module 200. For example, the opening 204 is located at an end (a left end of FIG. 3A or a right end of FIG. 3B) of the optical module 200, and the opening 205 is located at a side (an upper side of FIG. 3A or FIG. 3B) of the optical module 200. One of the openings is the electrical port 204, a connecting finger of the circuit board 300 extends from the electrical port 204, and definitions for pins of the connecting finger form various industry protocols and specifications, and the connecting finger is configured to be inserted into the master monitor (e.g., the optical network terminal 100); and another opening is the optical port 205, which is configured to access an external optical fiber (the optical fiber 101), so that the external optical fiber is connected to the silicon optical chip 400 inside the optical module 200.

By using an assembly mode of combining the upper shell 201 and the lower shell 202, it is possible to facilitate installation of the circuit board 300, the silicon optical chip 400 and the laser assembly 500 into the wrapping cavity, and the upper shell 201 and the lower shell 202 may form encapsulation protection for these devices. In addition, when assembling components such as the circuit board 300, the silicon optical chip 400 and the laser assembly 500, it is possible to facilitate arrangement of positioning structures, heat dissipation structures and electromagnetic shielding structures of these components, and it is possible to facilitate implementation of automated production.

In some embodiments, the upper shell 201 and the lower shell 202 are made of a metal material to facilitate electromagnetic shielding and heat dissipation.

In order to achieve higher heat dissipation efficiency and facilitate the dissipation of the heat inside the optical module 200, in some embodiments, at least one heat conduction column is disposed on an inner wall of the shell of the optical module 200, and the heat conduction column is configured to conduct the heat inside the shell of the optical module 200 to the shell of the optical module 200, so as to facilitate the dissipation of the heat inside the optical module 200.

Figure 5A:
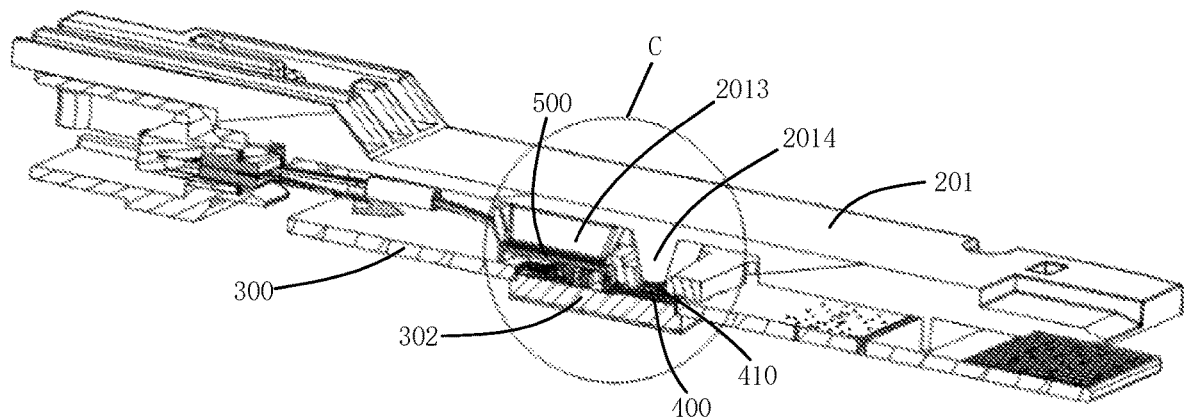
FIG. 5A is a sectional view of an optical module, in accordance with some embodiments.
Figure 5B:
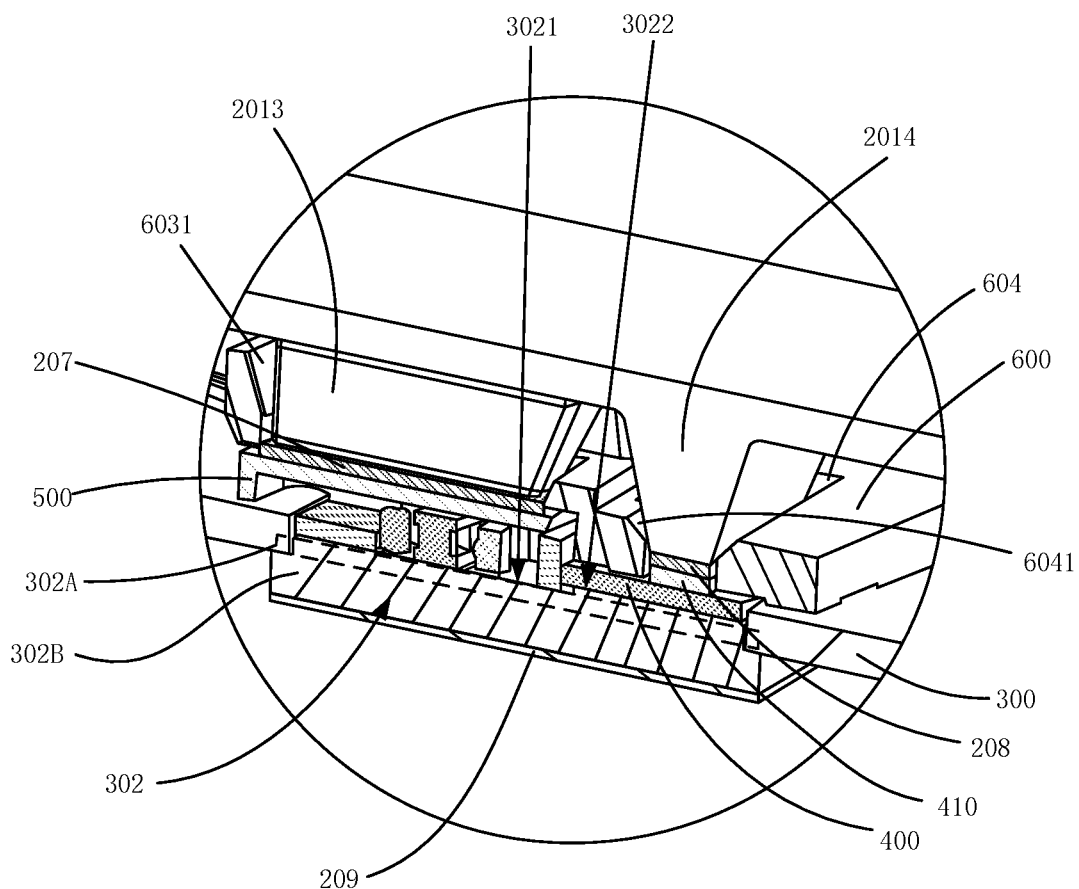
FIG. 5B is an enlarged view of a portion C in FIG. 5A.

FIG. 5A is a sectional view of an optical module in accordance with some embodiments, and FIG. 5B is an enlarged view of a portion C in FIG. 5A. For example, as shown in FIGS. 5A and 5B, the laser assembly 500 and the silicon optical chip 400 are disposed on a side of the circuit board 300 close to the upper shell 201, and the upper shell 201 includes a first heat conduction column 2013 and a second heat conduction column 2014. An orthogonal projection of the first heat conduction column 2013 on the circuit board 300 and an orthogonal projection of the laser assembly 500 on the circuit board 300 are at least partially overlapped, and an orthogonal projection of the second heat conduction column 2014 on the circuit board 300 and an orthogonal projection of the silicon optical chip 400 on the circuit board are at least partially overlapped. However, it is not limited thereto. In a case where the laser assembly 500 and the silicon optical chip 400 are disposed on a side of the circuit board 300 close to the lower shell 202, the lower shell 202 includes the first heat conduction column 2013 and the second heat conduction column 2014.

An outer surface of the laser assembly 500 proximate to the upper shell 201 is provided with a first heat conduction pad 207, and a free end of the first heat conduction column 2013 is in contact connection with the laser assembly 500 through the first heat conduction pad 207. An outer surface of the silicon optical chip 400 proximate to the upper shell 201 is provided with a transimpedance amplifier 410 and a modulator driver 420 (for the transimpedance amplifier 410 and the modulator driver 420, reference may also be made to FIGS. 6A to 6C and 7A to 7B), a second heat conduction pad 208 is disposed on a side of the transimpedance amplifier 410 and a side of the modulator driver 420 that are away from the silicon optical chip 400, and a free end of the second heat conduction column 2014 is in contact connection with the transimpedance amplifier 410 and the modulator driver 420 through the second heat conduction pad 208.

Here, the first heat conduction pad 207 is configured to improve efficiency at which heat of a box of the laser assembly 500 is transferred to the first heat conduction column 2013; and the second heat conduction pad 208 is configured to improve efficiency at which heat of the transimpedance amplifier 410 and the modulator driver 420 is transferred to the second heat conduction column 2014. Both the first heat conduction pad 207 and the second heat conduction pad 208 may be made of a thermally conductive adhesive.

In this case, heat generated by elements (laser chips, etc.) inside the laser assembly 500 may be transferred to the first heat conduction column 2013 through the first heat conduction pad 207, then transferred to the upper shell 201 of the optical module 200 through the first heat conduction column 2013, and finally dissipated through the upper shell 201. Heat generated by the transimpedance amplifier 410 and the modulator driver 420 is transferred to the second heat conduction column 2014 through the second heat conduction pad 208, then transferred to the upper shell 201 of the optical module 200 through the second heat conduction column 2014, and finally dissipated through the upper shell 201.

Therefore, the heat inside the optical module 200 may be transferred to the upper shell 201 of the optical module 200 through the first heat conduction column 2013 and the second heat conduction column 2014, and then the heat is conducted to an outside of the optical module 200, so as to avoid concentrated accumulation of the heat inside the optical module. Moreover, since the upper shell 201 of the optical module 200 is closer to the heat sink 107 on the cage 106 than the lower shell 202 of the optical module 200, conducting the heat inside the optical module 200 to the upper shell 201 may achieve heat dissipation at higher efficiency than conducting the heat inside the optical module 200 to the lower shell 202.

In some embodiments, the orthogonal projection of the first heat conduction column 2013 on the circuit board 300 is greater than or equal to the orthogonal projection of the laser assembly 500 on the circuit board 300 to increase a heat conduction area and improve a heat dissipation efficiency; and the orthogonal projection of the second heat conduction column 2014 on the circuit board 300 may be greater than or equal to the orthogonal projection of the silicon optical chip 400 on the circuit board 300 to increase a heat conduction area and improve a heat dissipation efficiency.

In addition, a sectional area of the free end of the first heat conduction column 2013 is smaller than that of a fixed end of the first heat conduction column 2013 at a contact position between the first heat conduction column 2013 and the upper shell 201, and a sectional area of the first heat conduction column 2013 gradually increases from the free end of the first heat conduction column 2013 to the fixed end of the same; and a sectional area of the free end of the second heat conduction column 2014 is smaller than that of a fixed end of the second heat conduction column 2014 at a contact position between the second heat conduction column 2014 and the upper shell 201, and a sectional area of the second heat conduction column 2014 gradually increases from the free end of the second heat conduction column 2014 to the fixed end of the same. For example, the first heat conduction column 2013 and the second heat conduction column 2014 are in a shape of a truncated cone or a truncated pyramid.

The first heat conduction column 2013 and the second heat conduction column 2014 may be integrally formed with the upper shell 201, or may be separate components and are assembled with the upper shell 201.

Based on this, in some embodiments, an upper surface of the upper shell 201 proximate to the cage 106 is provided with fins, and the fins are in contact with the cage 106 to increase the heat dissipation area and assist in the heat dissipation.

In some embodiments, the optical module 200 further includes an unlocking component 203. The unlocking component 203 is located on an outer wall of the shell of the optical module 200, and is configured to implement or release a fixed connection between the optical module 200 and the master monitor (e.g., the optical network terminal 100). FIGS. 3A and 4A show an example of the unlocking component 203.

In some embodiments, the unlocking component 203 is located on an outer wall of the lower shell 202, and pulling a tail end of the unlocking component 203 may move the unlocking component 203 on the outer wall of the lower shell 202. When the optical module 200 is inserted into the master monitor, the optical module 200 is engaged with the cage 106 of the master monitor by the unlocking component 203. In this case, pulling the unlocking component 203 may change a connection relationship between the unlocking component 203 and the master monitor, thereby releasing the engagement between the optical module 200 and the master monitor, so that the optical module 200 may be drawn out of the cage 106 of the master monitor.

The circuit board 300 includes circuit wires, electronic elements (e.g., capacitors, resistors, triodes, and metal-oxide-semiconductor field-effect transistors (MOSFET transistors)), and chips (e.g., a microcontroller unit (MCU), a clock and data recovery (CDR) chip, a power management chip, and a digital signal processing (DSP) chip). The electronic elements, the chips and other components in the circuit board 300, and the silicon optical chip 400, the laser assembly 500 and other components on the circuit board 300 are connected together through the circuit wires according to a circuit design, so as to implement functions of power supply, electrical signal transmission, grounding and the like. The silicon optical chip 400 and the laser assembly 500 are disposed on a same side of the circuit board 300. At least a part of the electronic components and the chips are configured to be connected to the silicon optical chip 400 or the laser assembly 500 through circuit wires, thereby supplying power to the silicon optical chip 400 or the laser assembly 500, or providing the grounding function for the silicon optical chip 400 or the laser assembly 500, or performing the electrical signal transmission with the silicon optical chip 400 or the laser assembly 500. For example, the power management chip supplies power to the laser assembly 500 through circuit wires, and the triodes or the MOSFET transistors are used as switches to control the laser assembly 500 to or not to emit light through circuit wires.

The circuit board 300 is generally a rigid circuit board, and the rigid circuit board may also implement a bearing function due to its relatively hard material, for example, the rigid circuit board may stably bear the electronic elements and the chips; in a case where the silicon optical chip 400 and the laser assembly 500 are located on the circuit board 300, the rigid circuit board may also provide stable bearing; and the rigid circuit board may also be inserted into the cage 106 of the master monitor.

For example, a surface of a tail end of the circuit board 300 has the connecting finger 301, the connecting finger 301 is composed of a plurality of pins separate from each other, the circuit board 300 is inserted into the cage 106, and is conductively connected to the electrical connector in the cage 106 through the connecting finger 301. The connecting finger 301 may be disposed on only one surface (e.g., an upper surface shown in FIGS. 4A and 4B) of the circuit board 300, or may be disposed on both upper and lower surfaces of the circuit board to adapt to an occasion with a demand for a large number of pins. The connecting finger 301 is configured to establish electrical connection with the master monitor, and the electrical connection may be used to achieve power supply, grounding, I2C communication, data signal communication, etc.

Of course, flexible circuit boards are also used in some optical modules 200. As a supplement to the rigid circuit board, a flexible circuit board is generally used in conjunction with the rigid circuit board. For example, the rigid circuit board may be connected to the silicon optical chip 400 and the laser assembly 500 by using the flexible circuit board instead of the circuit wires.

The silicon optical chip 400 and the laser assembly 500 are disposed on the circuit board 300, and are electrically connected to the circuit board 300. There is an optical connection between the silicon optical chip 400 and the laser assembly 500. Light emitted by the laser assembly 500 enters the silicon optical chip 400, and the silicon optical chip 400 receives the light from the laser assembly 500. In some embodiments, the laser assembly 500 provides light with a single wavelength to the silicon optical chip 400, the light has stable power and has no data, and the silicon optical chip 400 modulates the light to load data that needs to be transmitted into the light. In addition, the silicon optical chip 400 also receives light carrying data from the outside of the optical module, the silicon optical chip 400 converts the light into an current signal and transmits the current signal to the transimpedance amplifier 410, and the transimpedance amplifier 410 converts the current signal of the silicon optical chip 400 into a differential voltage and transmits the differential voltage to the DSP chip for further process, so as to extract the data in the light. That is to say, both the modulation of the light emitted by the optical module 200 and the demodulation of the light received by the optical module 200 are completed by the optical module 200.

In a feasible implementation, the circuit board 300 provides a data signal from the master monitor to the silicon optical chip 400, and the silicon optical chip 400 modulates the data signal into the light to form an optical signal, the optical signal is then transmitted to the outside of the optical module 200. In another feasible implementation, an optical signal from the outside of the optical module 200 is converted into a current signal through the silicon optical chip 400, and the current signal is transmitted to the transimpedance amplifier 410 and converted into a differential voltage by the transimpedance amplifier 410, the differential voltage is processed by the DSP chip to get an electrical signal, and the electrical signal is output to the master monitor through the circuit board 300.

In order to achieve the above modulation and demodulation of the optical signal, there is a need to assemble the circuit board 300, the silicon optical chip 400 and the laser assembly 500 according to predetermined positions to form a predetermined optical propagation path.

The light propagation path is very sensitive to a positional relationship between the silicon optical chip 400 and the laser assembly 500. However, the circuit board 300 is formed by stacking multiple layers of materials, each layer of material has a thermal expansion coefficient respectively, and different thermal expansion coefficients may cause deformations to different degrees at different positions of the circuit board 300, thereby causing a change of relative position between the silicon optical chip 400 and the laser assembly 500, which is not conductive to achievement of the predetermined optical propagation path. Therefore, in some embodiments, as shown in FIG. 4A, the silicon optical chip 400 and the laser assembly 500 are firstly mounted on a base 302, which is a plate-like structure made of a same material, and then the base 302 is disposed in the circuit board 300. Since the silicon optical chip 400 and the laser component 500 are disposed on a same base 302, and deformations generated at different positions of the base 302 are the same when the base 302 is heated, the deformations generated when the base 302 is heated have a same influence on the laser assembly 500 and the silicon optical chip 400, the change of the relative position between the silicon optical chip 400 and the laser assembly 500 caused by the deformations of the circuit board 300 may be reduced, stability of an alignment state of the laser assembly 500 and the silicon optical chip 400 is high, and assembly requirements for the laser assembly 500 and the silicon optical chip 400 are lowered.

A material of the base 302 is not limited. For example, a thermal expansion coefficient of the material of the base 302 is similar to a thermal expansion coefficient of a material of the silicon optical chip 400 and/or the laser assembly 500; and for example, the material of the silicon optical chip 400 is silicon, and the material of the laser assembly 500 is a Kovar alloy, and the material of the base 302 is silicon or glass. The Kovar alloy is also referred to as iron-nickel-cobalt alloy, or iron-nickel-cobalt glass sealing alloy, and generally contains 29% nickel and 18% cobalt, and the rest is iron. A thermal expansion coefficient of the Kovar alloy is reduced due to addition of cobalt, and is similar to that of glass, and the Kovar alloy is suitable for sealing with glass.

It can be seen from the above that, the silicon optical chip 400 and the laser assembly 500 are generally disposed on a same side of the circuit board 300. In this case, there are various positional relationships between the base 302 and the circuit board 300.

In some embodiments, as shown in FIGS. 4A and 5A to 5B, the circuit board 300 has a through hole 302a penetrating an upper and lower surfaces of the circuit board 300, the base 302 is disposed in the through hole 302a, and the silicon optical chip 400 and/or the laser assembly 500 are disposed on the base 302. In this way, it is possible not only to facilitate to reduce influence of the deformations of the circuit board 300 on the relative position between the silicon optical chip 400 and the laser assembly 500, but also to facilitate the electrical connection between the silicon optical chip 400 and/or the laser assembly 500 and the circuit board 300. In addition, the silicon optical chip 400 and/or the laser assembly 500 may dissipate heat to the base, so that the base 302 has both a support effect and a heat dissipation effect.

The base 302 includes a clamping portion 302A and a support step 302B. The support step 302B is disposed around the clamping portion 302A, the clamping portion 302A is clamped in the through hole 302a in the circuit board 300, and the support step 302B supports the circuit board 300. The clamping portion 302A is a structure in the dashed box in FIG. 5B, and the support step 302B is a structure below the dashed box in FIG. 5B. In addition, in order to enhance reliability of connection between the base 302 and the circuit board 300, the support step 302B of the base 302 and the circuit board 300 may be adhesively fixed by using a glue.

A thermal conductivity of the material of the base 302 is higher than a thermal conductivity of a material of the circuit board 300; for example, the base 302 is a silicon base or a glass base; and for another example, the base 302 is a copper alloy base with a thermal conductivity greater than that of the circuit board 300. Such a manner that the base 302 is disposed in the through hole 302a may facilitate the dissipation of the heat generated by the laser assembly 500 and the silicon optical chip 400.

In a case where the circuit board 300 has the through hole 302a penetrating the upper and lower surfaces of the circuit board, a surface of the base 302 away from the silicon optical chip 400 and the laser assembly 500 is in contact with the shell (e.g., the lower shell 202) of the optical module 200, so as to transfer the heat inside the optical module 200 to the shell of the optical module 200 through the base 302, and then conduct the heat to the outside of the optical module 200 to avoid the concentrated accumulation of the heat inside the optical module 200.

In addition, in some embodiments, as shown in FIGS. 5A to 5B, the surface of the base 302 away from the silicon optical chip 400 and the laser assembly 500 is further provided with a third heat conduction pad 209, and the base 302 is in contact with the shell (e.g., the lower shell 202) of the optical module 200 through the third heat conduction pad 209. The third heat conduction pad 209 is configured to improve efficiency at which heat of the base 302 is transferred to the shell of the optical module 200, and the third heat conduction pad 209 may be made of a thermally conductive adhesive.

In some other embodiments, the circuit board 300 is provided with no through hole, and the base 302 is disposed on the circuit board 300. In yet some other embodiments, the circuit board 300 is provided with a counterbore (i.e., a blind hole), and the base 302 is embedded in the blind hole in the circuit board 300. In order to achieve optical coupling between the silicon optical chip 400 and the laser assembly 500, a light exit surface of the laser assembly 500 and a light incident surface of the silicon optical chip 400 need to be at a same height. The optical coupling here refers to a phenomenon in which two or more optical elements are in an interfitting relationship, and light is transmitted from one optical element into another optical element. Since the silicon optical chip 400 is manufactured by using thin-film growth and etching processes, it has a high integration level and a relatively small volume; while the laser assembly 500 has a relatively large volume. If a bottom face of the silicon optical chip 400 and a bottom face of the laser assembly 500 are disposed in a same plane of the base 302, the height of the light exit surface of the laser assembly 500 will be greater than the height of the light incident surface of the silicon optical chip 400.

As shown in FIGS. 4A and 5A to 5B, the base 302 includes a first step face 3021 and a second step face 3022. The first step face 3021 and the second step face 3022 are located on a surface of the base 302 on which the silicon optical chip 400 and the laser assembly 500 are disposed (both the first step face 3021 and the second step face 3022 being a surface of the clamping portion 302A), and in a case where the surface of the base 302 away from the silicon optical chip 400 and the laser assembly 500 is a bottom face, a height of the first step face 3021 from the bottom face is smaller than a height of the second step face 3022 from the bottom face. Providing the laser assembly 500 on the first step face 3021 and providing the silicon optical chip 400 on the second step face 3022 may balance a difference between the heights of the silicon optical chip 400 and the laser assembly 500.

It will be noted that, the light exit surface of the laser assembly 500 is a surface of the laser assembly 500 proximate to the silicon optical chip 400, and the light incident surface of the silicon optical chip 400 is a surface of the silicon optical chip 400 proximate to the laser assembly 500.

Figure 6A:
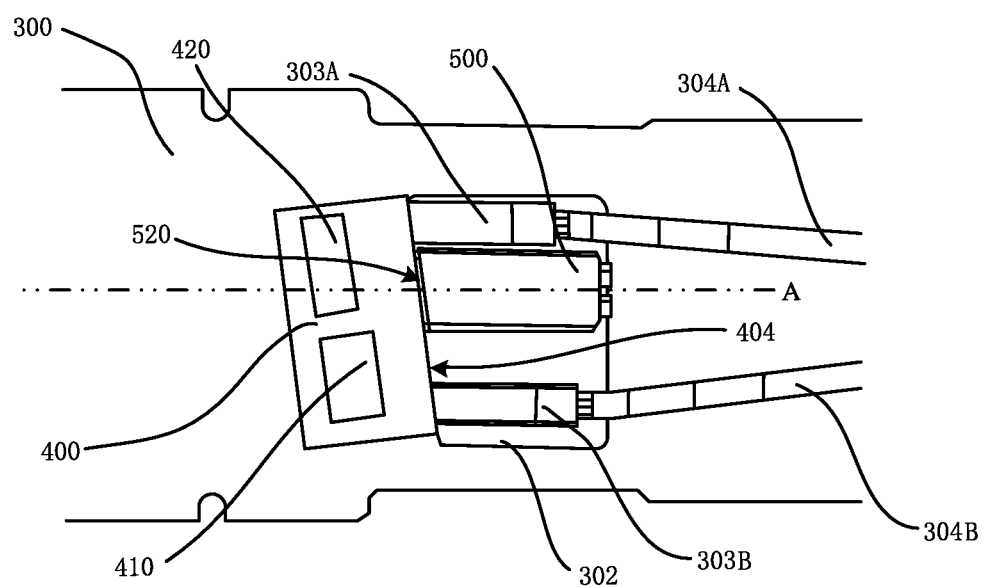
FIG. 6A is a schematic diagram showing an assembly relationship among a circuit board, a silicon optical chip and a laser assembly in an optical module, in accordance with some embodiments.
Figure 6B:
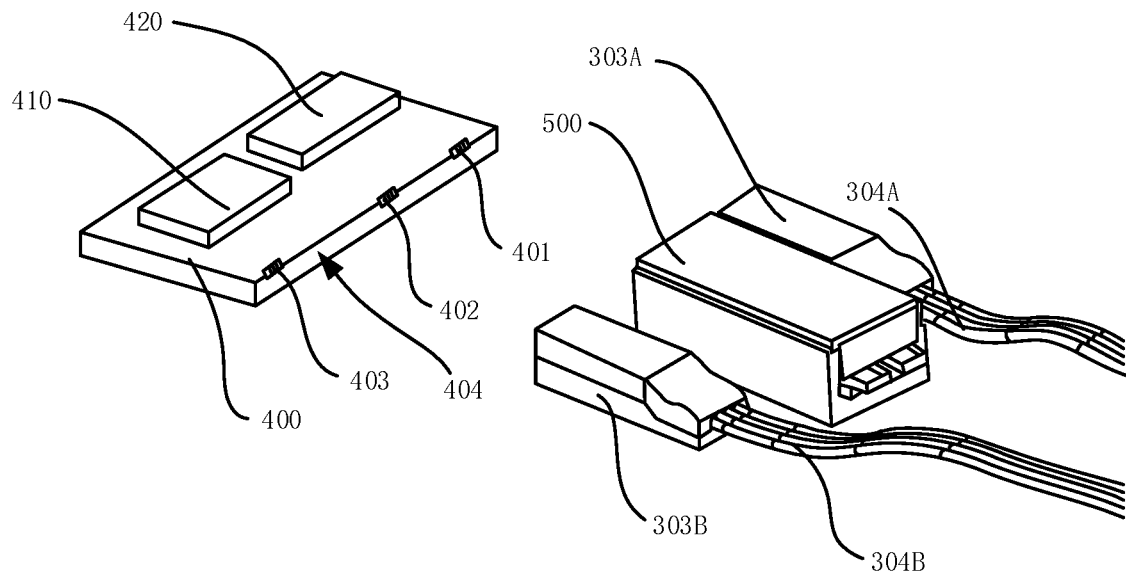
FIG. 6B is a schematic diagram showing an exploded structure of an assembly relationship between a silicon optical chip and a laser assembly in an optical module, in accordance with some embodiments.
Figure 6C:
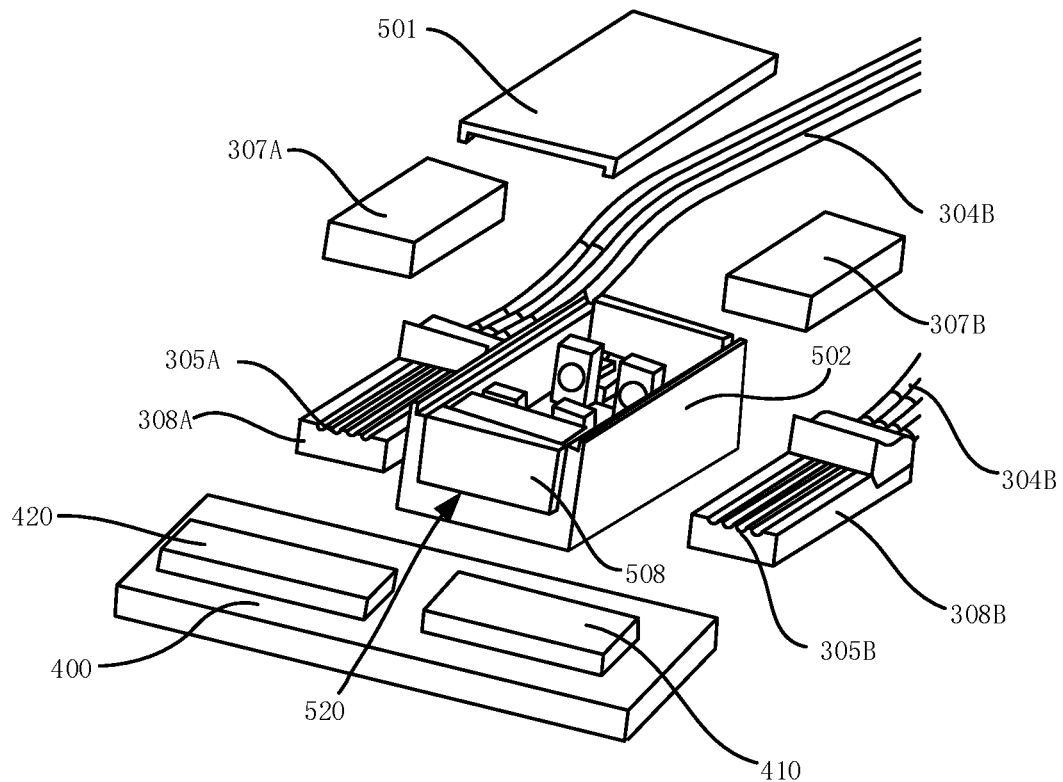
FIG. 6C is a schematic diagram showing another exploded structure of an assembly relationship between a silicon optical chip and a laser assembly in an optical module, in accordance with some embodiments.

FIG. 6A is a schematic diagram showing an assembly relationship of a circuit board, a silicon optical chip and a laser assembly, in accordance with some embodiments. FIG. 6B is a schematic diagram showing an exploded structure of an assembly relationship between a silicon optical chip and a laser assembly, in accordance with some embodiments, and FIG. 6C is a schematic diagram showing another exploded structure of an assembly relationship between a silicon optical chip and a laser assembly, in accordance with some embodiments. As shown in FIG. 6A, the silicon optical chip 400 and the laser assembly 500 are disposed on the base 302, so that the light exit surface of the laser assembly 500 is optically coupled to the light incident surface of the silicon optical chip 400.

In some embodiments, in order to allow light to smoothly enter the silicon optical chip 400 from the laser assembly 500, the light incident surface of the silicon optical chip 400 proximate to the laser assembly 500 has a first optical waveguide end facet 401, a second optical waveguide end facet 402 and a third optical waveguide end facet 403, and each optical waveguide end facet is corresponding to at least one optical channel. In some embodiments, the second optical waveguide end facet 402 is corresponding to two optical channels. Among these optical waveguide end facets, the second optical waveguide end facet 402 is optically coupled to the laser assembly 500, and is configured to receive light without carrying a signal emitted by the laser assembly 500; the first optical waveguide end facet 401 is configured to transmit an optical signal obtained after the modulation by the silicon optical chip 400 to the outside of the optical module 200; and the third optical waveguide end facet 403 is configured to receive an optical signal from the outside the optical module 200 and transmit the optical signal to the silicon optical chip 400, so that the silicon optical chip 400 converts the optical signal into an electrical signal.

For example, the optical module 200 further includes a first optical fiber array 303A, a first optical fiber ribbon 304A, a second optical fiber array 303B, and a second optical fiber ribbon 304B. The first optical fiber ribbon 304A is a thin flat strip formed by curing a plurality of optical fibers 305A arranged in parallel by using ultraviolet light, and the second optical fiber ribbon 304B is a thin flat strip formed by curing a plurality of optical fibers 305B arranged in parallel by using the ultraviolet light. One end of the first optical fiber array 303A is optically coupled to the first optical waveguide end facet 401, and another end is connected to the optical fiber socket 306 shown in FIG. 4A or 4B through the first optical fiber ribbon 304A; and one end of the second optical fiber array 303B is optically coupled to the third optical waveguide end facet 403, and another end is connected to the optical fiber socket 306 shown in FIG. 4A or FIG. 4B through the second optical fiber ribbon 304B. The optical fiber socket 306 forms the optical port 205 of the optical module 200, and is configured to connect the optical fiber 101 outside the optical module 200.

As shown in FIG. 6C, the first optical fiber array 303A includes an upper substrate 307A and a lower substrate 308A. The lower substrate 308A is provided with grooves, the optical fibers 305A are disposed in the grooves, and the upper substrate 307A covers the lower substrate 308A on a side of the lower substrate 308A where the grooves are provided. Similarly, the second optical fiber array 303B includes an upper substrate 307B and a lower substrate 308B. The lower substrate 308B is provided with grooves, the optical fibers 305B are disposed in the grooves, and the upper substrate 307B covers the lower substrate 308B on a side of the lower substrate 308B where the grooves are provided.

The light emitted by the laser assembly 500 enters a waveguide inside the silicon optical chip 400 through the second optical waveguide end facet 402, then enters the first optical fiber array 303A through the first optical waveguide end facet 401 after being modulated into an optical signal by the silicon optical chip 400, and then is transmitted to the optical fiber socket 306 through the first optical fiber array 303A and the first optical fiber ribbon 304A, thereby achieving a light emission process of the optical module 200. The external optical signal enters the second optical fiber array 303B through the optical fiber socket 306 and the second optical fiber ribbon 304B, then is transmitted to the silicon optical chip 400 through the third optical waveguide end facet 403 and its corresponding waveguide, and then is converted by the silicon optical chip 400 to form an electrical signal, thereby achieving a light receiving process of the optical module 200.

In some embodiments, as shown in FIGS. 6A to 6C, the light incident surface 404 of the silicon optical chip 400 is not perpendicular to an axial direction A of the laser assembly 500, and the axial direction A of the laser assembly 500 is shown by the two-dot chain line in FIG. 6A. For example, the light incident surface 404 of the silicon optical chip 400 and a side face opposite to the light incident surface 404 are parallel to each other, and the light exit surface 520 of the laser assembly 500 is not perpendicular to the axial direction of the laser assembly 500. In this case, the silicon optical chip 400 is obliquely disposed with respect to the laser assembly 500. Accordingly, neither of side faces of the first optical fiber array 303A and the second optical fiber array 303B that are coupled to the silicon optical chip 400 are perpendicular to the axial direction A of the laser assembly 500. The light emitted from the light exit surface 520 of the laser assembly 500 is refracted at the light incident surface 404 of the silicon optical chip 400 to meet requirements of the silicon optical chip 400 for a light incident angle, so that the light smoothly enters the silicon optical chip 400, which will be described in detail later.

It will be understood that, the silicon optical chip 400 and the circuit board 300 need to be electrically connected, and a manner in which the silicon optical chip 400 is electrically connected to the circuit board 300 is not exclusive. In some embodiments, the silicon optical chip 400 is provided with bonding pads, and the silicon optical chip 400 is electrically connected to the circuit board 300 through the bonding pads by means of wire bonding. For example, the bonding pads of the silicon optical chip 400 are electrically connected to the circuit board 300 by means of gold wire bonding.

During encapsulation of the shell of the optical module 200 or during use of the optical module 200, due to tiny and fragile gold wires (a small wire diameter) and small spacing between wires caused by dense wiring, the gold wires are very prone to phenomena such as deformation, damage and collapse, thereby causing defects such as a short circuit or an open circuit, and further affecting a quality of the optical signal.

Figure 7A:
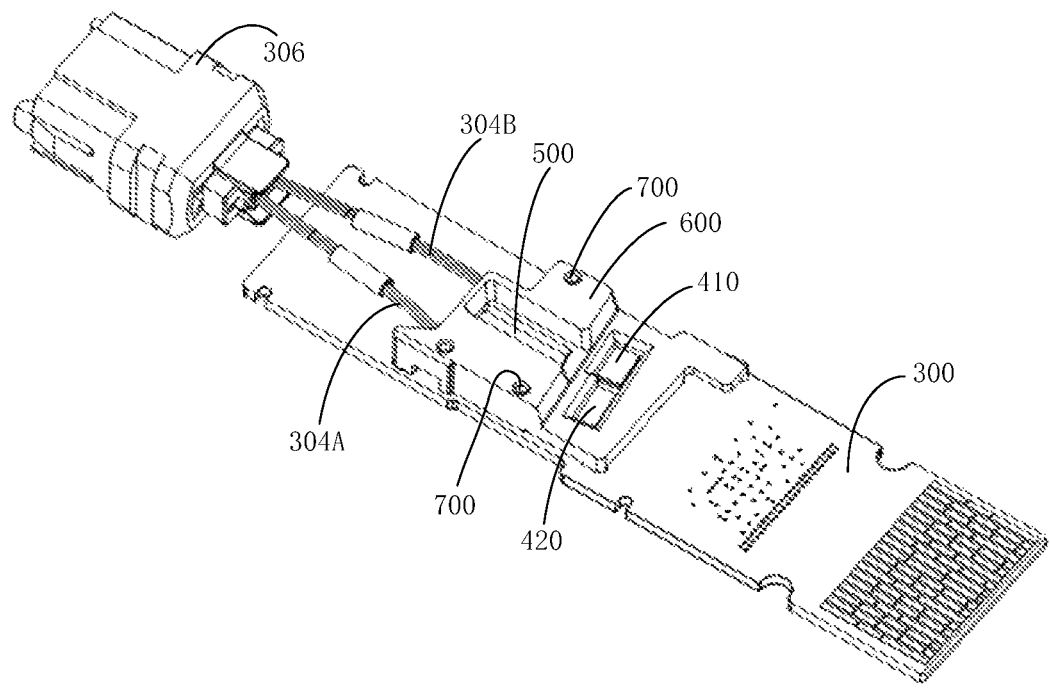
FIG. 7A is a schematic diagram showing an assembly relationship between a circuit board and a protective cover in an optical module, in accordance with some embodiments.
Figure 7B:
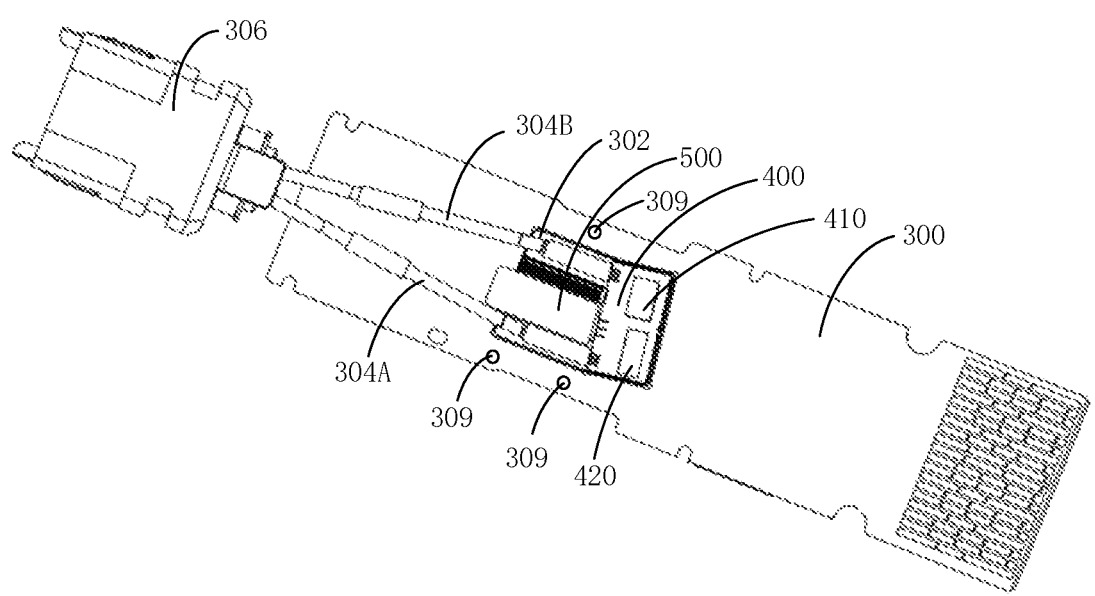
FIG. 7B is a schematic diagram of a circuit board without a protective cover in an optical module, in accordance with some embodiments.
Figure 7C:
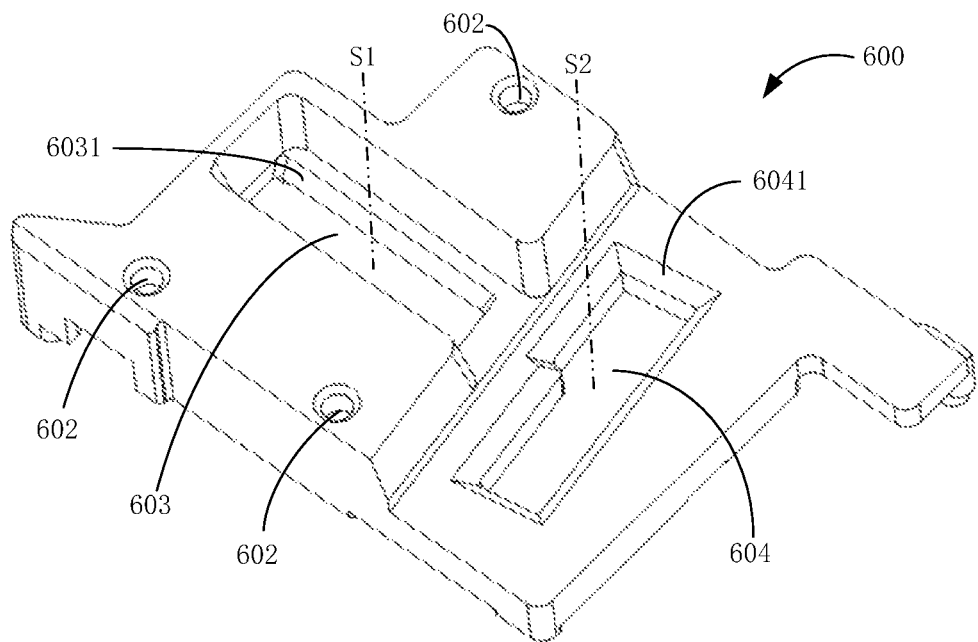
FIG. 7C is a schematic diagram showing a structure of a protective cover in an optical module, in accordance with some embodiments.

Based on this, in some embodiments, as shown in FIGS. 7A to 7C, the optical module 200 further includes a protective cover 600, which is configured to protect electrical connection wires between the silicon optical chip 400 and the circuit board 300. For example, the protective cover 600 covers on the circuit board 300 and forms an enclosed space with the circuit board 300, and the silicon optical chip 400 and a wiring region of the silicon optical chip 400 are both encapsulated in the enclosed space.

In addition, since the laser assembly 500 is also electrically connected to the circuit board 300 by means of wire bonding, in some embodiments, the protective cover 600 is further configured to protect electrical connection wires between the laser assembly 500 and the circuit board 300. That is to say, the protective cover 600 covers on the circuit board 300 and forms the enclosed space with the circuit board 300, and the silicon optical chip 400 and the wiring region of the silicon optical chip 400, and the laser assembly 500 and a wiring region of the laser assembly 500 are all encapsulated in the enclosed space.

It will be noted that, "being encapsulated in the enclosed space" refers to an assembly manner by which the silicon optical chip 400 and the wiring region of the silicon optical chip 400, and the laser assembly 500 and the wiring region of the laser assembly 500 are in clearance fit with the protective cover 600 in the enclosed space formed by the protective cover 600 and the circuit board 300.

In some embodiments, the protective cover 600 is bonded to the circuit board 300 through a glue. In some other embodiments, as shown in FIGS. 7A to 7C, the protective cover 600 is fixedly connected to the circuit board 300 through at least two fixing pins 700. For example, the circuit board 300 includes fixing holes 309, the protective cover 600 includes via holes 602, and the fixing pins 700 pass through the via holes 602 to be fitted with the fixing holes 309 to fix the protective cover 600 on the circuit board 300.

It will be noted that, the fixing holes 309 in the circuit board 300 need to escape the circuit wires, the electronic elements (e.g., the capacitors, the resistors, the triodes and the MOSFET transistors) and the chips (e.g., the MCU, the CDR chip, the power management chip and the DSP chip) and other components on the circuit board 300.

The protective cover 600 may be made of a transparent resin material such as transparent Polyetherimide (PEI) or Polycarbonate (PC). The PEI is high-temperature resistant and has strong high-temperature stability. The PEI has a heat deformation temperature of 220° C., and may be used for a long time at an operation temperature of −160° C. to 180° C.; and the PEI also has good flame retardancy (a flame rating being UL94-V-0, and UL94 being American standard for the flame rating), and good chemical-reaction resistance and electrical insulation properties. In addition, the PEI may also be processed into a thin-walled product with a small wall thickness.

In some embodiments, an inner surface and an outer surface of the protective cover 600 are both mirror-polished, so that when the electrical connection wires between the silicon optical chip 400 and the circuit board 300 are damaged and/or the electrical connection wires between the laser assembly 500 and the circuit board 300 are damaged in the optical module 200, a position where the damage occurs may be visually identified without a need to disassemble the protection cover 600.

As described above, in some embodiments, the shell of the optical module 200 includes at least one heat conduction column. In this case, the protective cover 600 further includes at least one escape opening that allow the at least one heat conduction column to pass and enter an inside of the protective cover 600. For example, the upper shell 201 includes the first heat conduction column 2013 and the second heat conduction column 2014, and the protective cover 600 includes a first escape opening 603 and a second escape opening 604. The first heat conduction column 2013 passes through the first escape opening 603 to be in thermal conductive connection with the laser assembly 500, and the second heat conduction column 2014 passes through the second escape opening 604 to be in thermal conductive connection with the transimpedance amplifier 410 and the modulator driver 420.

The first escape opening 603 includes a first inclined surface 6031, the first inclined surface 6031 is located at an edge of an inner wall of the first escape opening 603, and the first inclined surface 6031 may enlarge a sectional area of the first escape opening 603. That is, in a direction of an axis S1 of the first escape opening 603 and away from the circuit board 300 (or the laser assembly 500), the sectional area of the first escape opening 603 gradually increases, which facilitates the first heat conduction column 2013 to pass. In addition, the first inclined surface 6031 may also match the inner wall of the first escape opening 603 with an outer wall of the first heat conducting column 2013, thereby making it easier for the first heat conduction column 2013 to pass. The second escape opening 604 includes a second inclined surface 6041, the second inclined surface 6041 is located at an edge of an inner wall of the second escape opening 604, and the second inclined surface 6041 may enlarge a sectional area of the second escape opening 604. That is, in a direction of an axis S2 of the second escape opening 604 and away from the circuit board 300 (or the silicon optical chip 400), the sectional area of the second escape opening 604 gradually increases, which facilitates the second heat conduction column 2014 to pass. In addition, the second inclined surface 6041 may also match the inner wall of the second escape opening 604 with an outer wall of the second heat conduction column 2014, thereby making it easier for the second heat conduction column 2014 to pass.

In some embodiments, a bottom of the edge of the inner wall of the first escape opening 603 in the protective cover 600 compresses the laser assembly 500; and a bottom of the edge of the inner wall of the second escape opening 604 compresses the silicon optical chip 400, or the bottom of the edge of the inner wall of the second escape opening 604 compresses the silicon optical chip 400 by compressing the transimpedance amplifier 410 and the modulator driver 420.

For the structures of the first escape opening 603 and the second escape opening 604, reference may also be made to FIGS. 5A to 5B.

A conventional silicon optical chip is mainly composed of a light source, a modulator, a detector, a passive waveguide and other elements, and these elements are integrated on a same silicon-based substrate. Through modulation of light by the modulator, the silicon optical chip may convert an electrical signal to an optical signal. It will be noted that, in some embodiments of the present disclosure, since a material of the silicon-based substrate used in the silicon optical chip 400 is not an ideal light-emitting material for laser chips, the silicon optical chip 400 does not have a light source integrated therein, and the laser assembly 500 (including laser chips, which will be described in detail later) serves as a light source to provide light with the silicon optical chip 400.

In some embodiments, a modulator in the silicon optical chip 400 is a Mach-Zehnder interferometer, through which modulation of the optical signal is achieved. In detail, according to an interference principle of light, the Mach-Zehnder interferometer splits an input light beam into two light beams with a same wavelength and a same intensity, and a phase difference of the two light beams is changed by a change of an electrical signal which is applied externally, and when the two light beams are merged again through interference, the intensity of the merged light will be changed according to the change of the electrical signal applied externally. This is equivalent to converting the electrical signal into the optical signal, thereby achieving the modulation of the light.

The transimpedance amplifier 410 on the silicon optical chip 400 is configured to convert a current signal generated by the silicon optical chip 400 into a differential voltage and transmit the differential voltage to the DSP chip for further process, so as to extract the data in the light.

The modulator driver 420 on the silicon optical chip 400 is configured to amplify an electrical signal from the DSP chip and transmit the electrical signal to the Mach-Zehnder interferometer to modulate light without carrying a signal within the silicon optical chip 400, so as to covert the electrical signal into an optical signal.

Figure 8A:
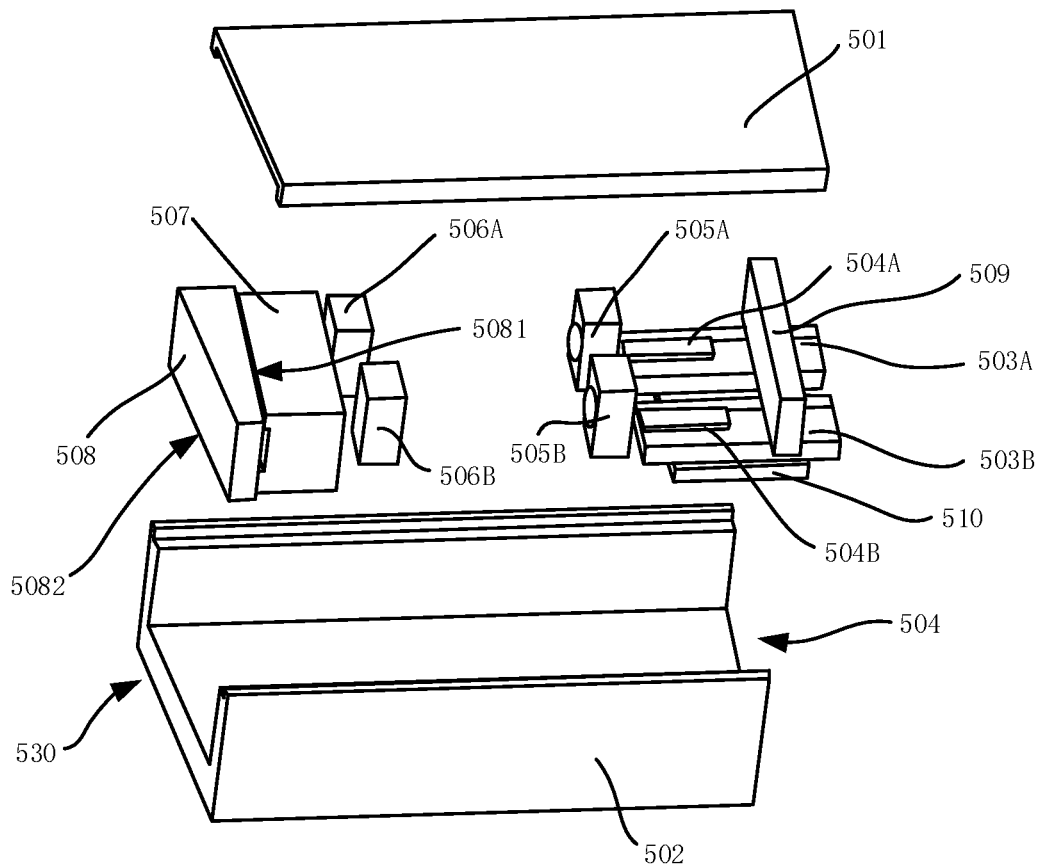
FIG. 8A is a schematic diagram showing an exploded structure of a laser assembly in an optical module, in accordance with some embodiments.

The following describes how the laser assembly 500 provides two light beams with a same or similar wavelength and a same or similar intensity with the silicon optical chip 400. FIG. 8A is a schematic diagram showing an exploded structure of a laser assembly in an optical module, in accordance with some embodiments, and FIG. 8B is a schematic diagram showing an exploded structure of another laser assembly in an optical module, in accordance with some embodiments.

Figure 8B:
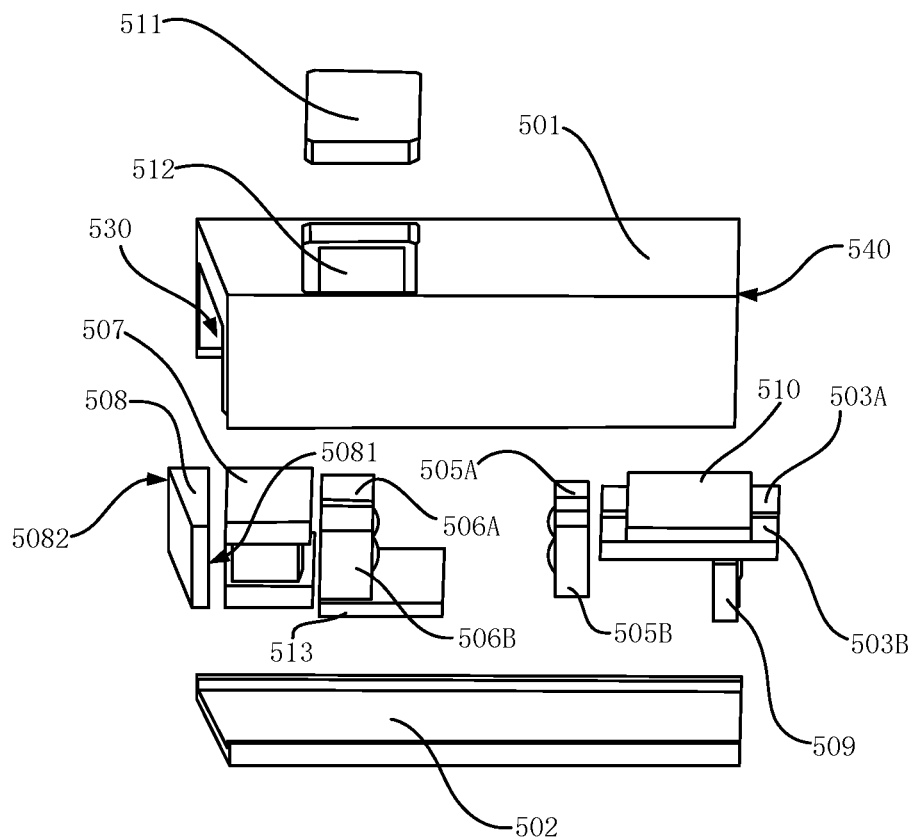
FIG. 8B is a schematic diagram showing an exploded structure of another laser assembly in an optical module, in accordance with some embodiments.

In some embodiments, as shown in FIGS. 8A and 8B, the laser assembly 500 includes an upper box 501, a lower box 502, a light transmitting member 508, conductive substrates 503A and 503B, and laser chips 504A and 504B.

For example, the upper box 501 and the lower box 502 are combined to form a cavity with two openings 530 and 540, and the two openings 530 and 540 are located at both ends of the laser assembly 500 in the axial direction A (for the axial direction A, reference may be made to FIG. 6A), and includes a first opening 530 located in an optical path where the light emitted by the laser chips 504A and 504B is directed toward the silicon optical chip 400, and a second opening 540 away from the silicon optical chip 400. The light transmitting member 508 is located between the upper box 501 and the lower box 502, and is configured to enclose the first opening 530 of the laser assembly 500, and the light emitted by the laser chips 504A and 504B enters the silicon optical chip 400 after passing through the light transmitting member 508.

The upper box 501 and the lower box 502 may have various structures to form the cavity. As shown in FIG. 8A, the upper box 501 includes only one upper cover plate, and the lower box 502 includes a lower cover plate and two opposite side plates located at two opposite long sides of the lower cover plate and perpendicular to the lower cover plate. FIG. 8B discloses a structure different from this. As shown in FIG. 8B, the upper box 501 includes an upper cover plate and two opposite side plates located at two opposite long sides of the upper cover plate and perpendicular to the upper cover plate, and the lower box 502 includes only one lower cover plate. Although not shown, it may be obtained that, in some embodiments, the upper box 501 includes the upper cover plate and the two opposite side plates located at the two opposite long sides of the upper cover plate and perpendicular to the upper cover plate, and the lower box 502 includes the lower cover plate and the two opposite side plates located at the two opposite long sides of the lower cover plate and perpendicular to the lower cover plate.

The conductive substrates 503A and 503B are partially located in the cavity, and partially extend out of the second opening 540 and are located outside the cavity; and the laser chips 504A and 504B are respectively disposed on the conductive substrates 503A and 503B and are located in the cavity. In this case, the laser assembly 500 further includes at least one blocking member 509 or 510. The at least one blocking member 509 or 510 is located between the upper box 501 and the lower box 502, and is configured to enclose the second opening 540 of the laser assembly 500.

For example, the at least one blocking member 509 or 510 includes a first blocking member 509 and a second blocking member 510, and the conductive substrates 503A and 503B are located between the first blocking member 509 and the second blocking member 510 to enclose the second opening 540 of the laser assembly 500. As shown in FIG. 8A, the first blocking member 509 is located between the conductive substrates 503A and 503B and the upper box 501, and the second blocking member 510 is located between the conductive substrates 503A and 503B and the lower box 502. Or, as shown in FIG. 8B, the first blocking member 509 is located between the conductive substrates 503A and 503B and the lower box 502, and the second blocking member 510 is located between the conductive substrates 503A and 503B and the upper box 501.

Portions of the conductive substrates 503A and 503B extending out of the second opening 540 may be electrically connected to the circuit board 300 by means of bonding. It will be noted that, in some embodiments, the conductive substrates 503A and 503B are entirely located in the cavity, and wires for connecting the conductive substrates 503A and 503B extend out of the second opening 540 and are electrically connected to the circuit board 300, thereby achieving the electrical connection between the conductive substrates 503A and 503B and the circuit board 300.

The upper box 501, the lower box 502, the light transmitting member 508, and the at least one blocking member 509 or 510 form a relatively closed cavity, so as to provide a relatively sealed environment for other elements (e.g., the laser chips 504A and 504B) inside the laser assembly 500, prevent moisture and the like from affecting these elements and affecting the optical path, and protect the elements inside the laser assembly 500.

In some embodiments, a material of the at least one blocking member is at least one of ceramic, Kovar alloy, solidified glue or die-cast metal. A material of the conductive substrates is metalized ceramic, and the conductive substrates each include a ceramic plate and a circuit pattern formed on a surface of the ceramic plate according to different electrical connection requirements. A material of the light transmitting member is glass or solidified glue. The upper box 501 and the lower box 502 may be made of a thermally conductive material, such as copper alloy.

It will be noted that, the laser assembly 500 is not limited to the use of the upper box 501, the lower box 502, the light transmitting member 508 and the at least one blocking member 509 or 510 to form the relatively closed cavity, and the laser assembly 500 may also form the relatively closed cavity by means of the base 302. In some embodiments, as shown in FIGS. 12A to 12D, the laser assembly 500 includes the upper box 501, the light transmitting member 508, the conductive substrates 503A and 503B, and the laser chips 504A and 504B.

For example, the upper box 501 and the base 302 are combined to form a cavity with an opening 550, and the opening 550 is located in the optical path where the light emitted by the laser chips 504A and 504B is directed toward the silicon optical chip 400. The conductive substrates 503A and 503B are disposed in the cavity and are mounted on the base 302, and the laser chips 504A and 504B are respectively disposed on surfaces of the conductive substrates 503A and 503B away from the base 302. The light transmitting member 508 is located between the base 302 and the upper box 501, and is configured to enclose the opening 550 of the laser assembly 500. The light emitted by the laser chips 504A and 504B enters the silicon optical chip 400 after passing through the light transmitting member 508. The upper box 501 and the base 302 may be fixed by using a glue. With such an arrangement, the conductive substrates 503A and 503B and the laser chips 504A and 504B are directly wrapped by the upper box 501 and the base 302, which facilitates encapsulation of the laser assembly 500.

The conductive substrates 503A and 503B need to be electrically connected to the circuit board 300 by means of bonding. Therefore, a slot 560 is disposed between the upper box 501 and the base 302. The slot 560 allows the conductive substrates 503A and 503B to extend out of the cavity formed by the upper box 501 and the base 302, or allows the wires for electrically connecting the conductive substrates 503A and 503B to the circuit board 300 to extend out of the cavity formed by the upper box 501 and the base 302.

Figure 12A:
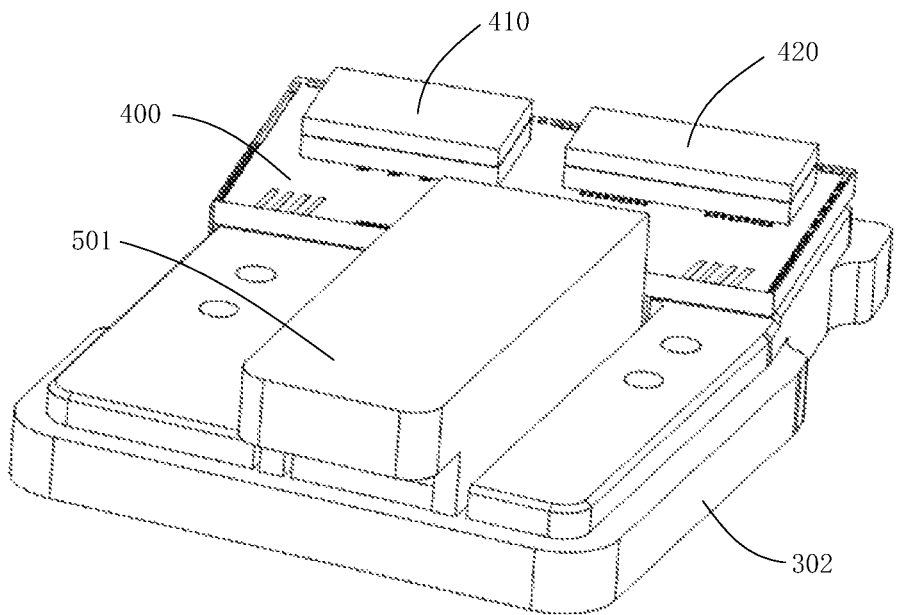
FIG. 12A is a schematic diagram showing an assembly relationship among a base, a silicon optical chip and a laser assembly in an optical module, in accordance with some embodiments.
Figure 12B:
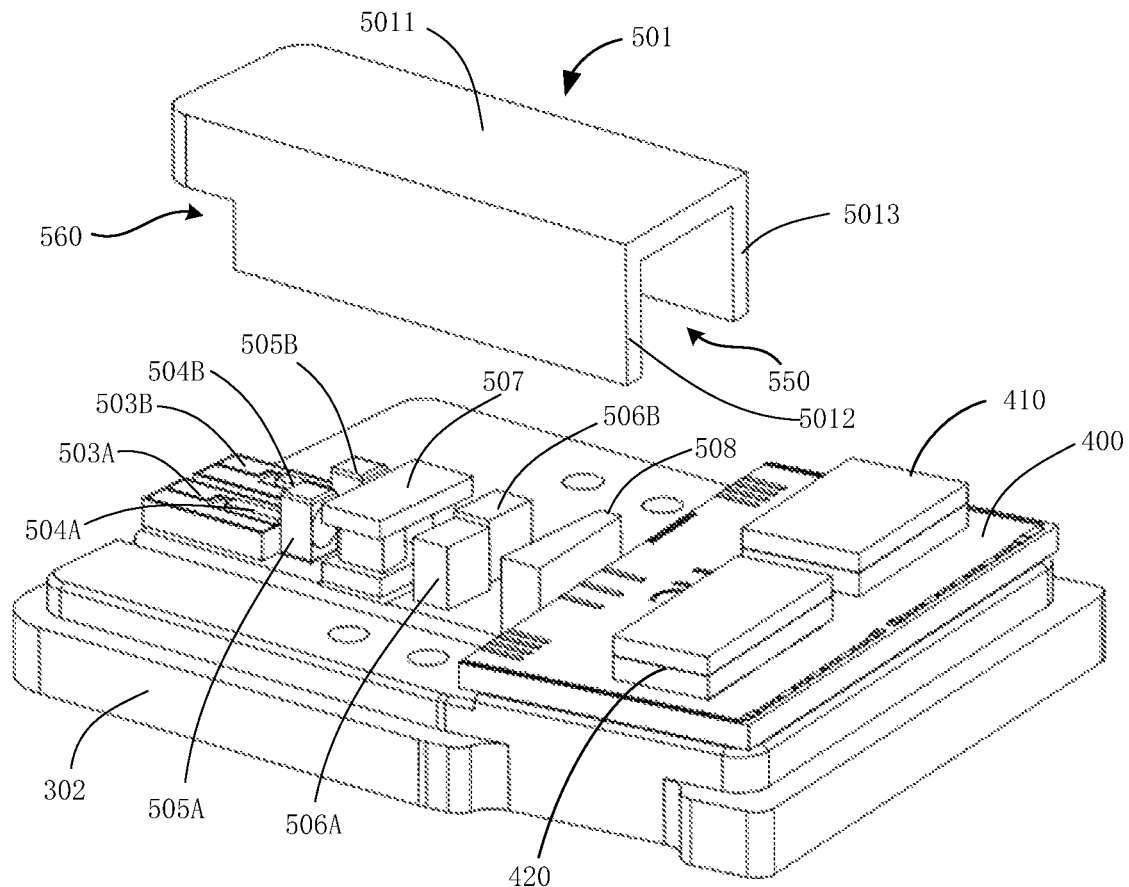
FIG. 12B is a schematic diagram showing an exploded structure of an assembly relationship among a base, a silicon optical chip and a laser assembly in an optical module, in accordance with some embodiments.
Figure 12C:
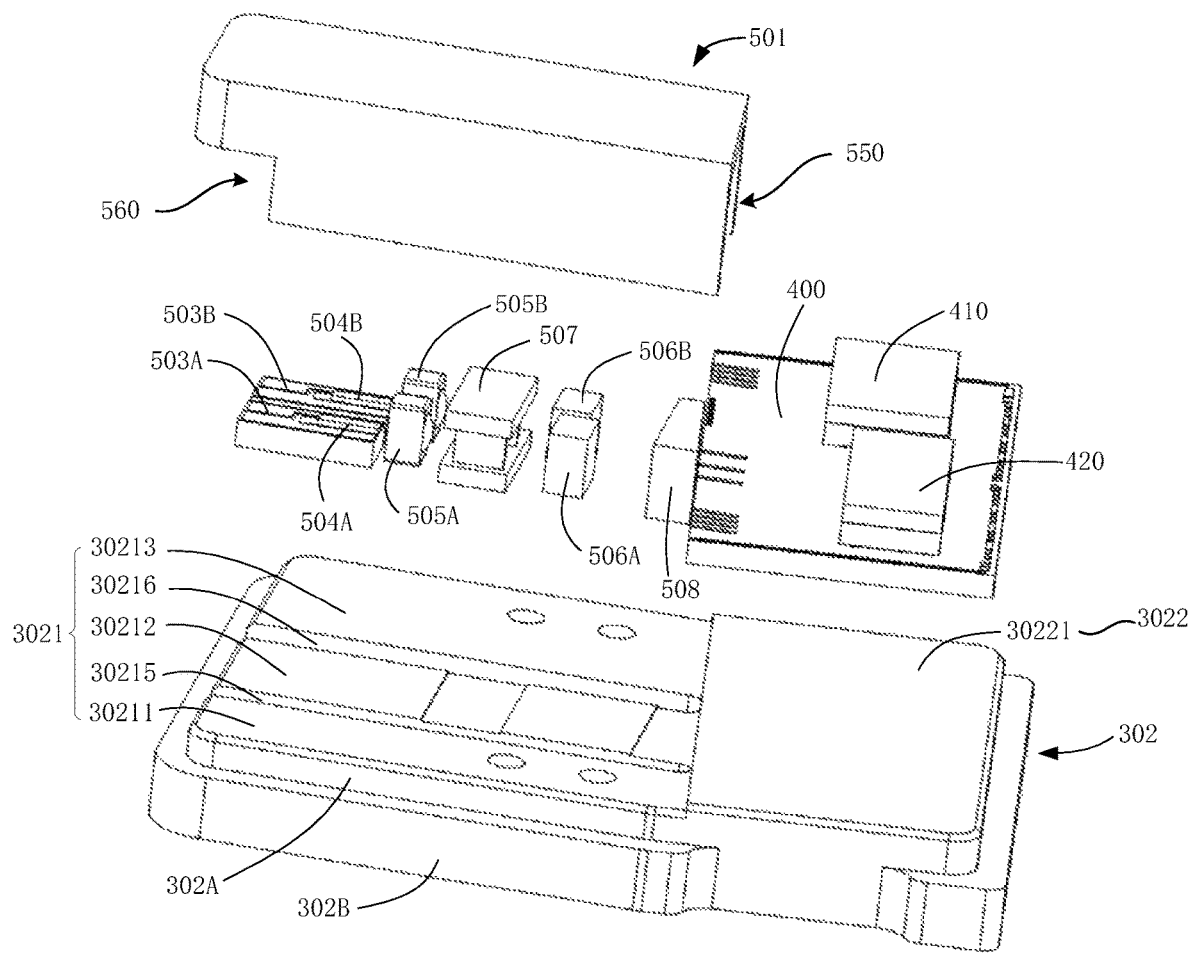
FIG. 12C is a schematic diagram showing another exploded structure of an assembly relationship among a base, a silicon optical chip and a laser assembly in an optical module, in accordance with some embodiments.
Figure 12D:
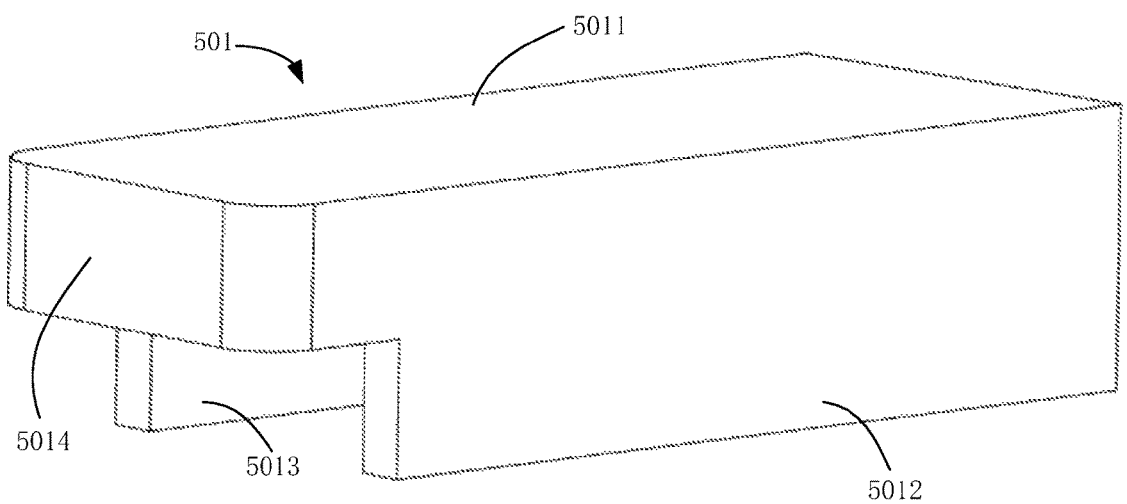
FIG. 12D is a schematic diagram of an upper box of a laser assembly in an optical module, in accordance with some embodiments.

In order to form the opening 550 and the slot 560, as shown in FIG. 12B or 12D, the upper box 501 includes a cover plate 5011, and a first side plate 5012, a second side plate 5013 and a third side plate 5014 that are disposed around the cover plate 5011. The first side plate 5012 and the second side plate 5013 are oppositely disposed on both sides of the cover plate 5011 in a length direction thereof, and the third side plate 5014 is disposed on a side of the cover plate 5011 in a width direction thereof. An upper surface of the base 302 includes a first region 30211, a second region 30212 and a third region 30213 that are disposed side by side on the first step face 3021, and a fourth region 30221 disposed on the second step face 3022 of the base 302. An arrangement direction of the first region 30211, the second region 30212 and the third region 30213 is perpendicular to an arrangement direction of the first step face 3021 and the second step face 3022. The first region 30211 is configured to carry the first optical fiber array 303A, the second region 30212 is configured to fix and carry the laser assembly 500, the third region 30213 is configured to carry the second optical fiber array 303B, and the fourth region 30221 is configured to carry the silicon optical chip 400.

A first gap 30215 is disposed between the first region 30211 and the second region 30212, and a second gap 30216 is disposed between the second region 30212 and the third region 30213. A bottom of the first side plate 5012 is clamped in the first gap 30215, and a bottom of the second side plate 5013 is clamped in the second gap 30216, thereby achieving installation and fixation of the upper box 501. As such, the opening 550 is formed in the optical path where the light emitted by the laser chips 504A and 504B is directed toward the silicon optical chip 400, and the slot 560 is formed in a direction of the laser chips 504A and 504B away from the silicon optical chip 400.

In some embodiments, widths of the first gap 30215 and the second gap 30216 are slightly greater than thicknesses of the first side plate 5012 and the second side plate 5013, which not only facilitates the installation and fixation of the upper box 501, but also reduces heat conducted to the first region 30211 and the third region 30213 from the second region 30212 and generated by the laser assembly 500 on the second region 30212, thereby achieving heat insulation between the second region 30212 and both the first region 30211 and the third region 30213. The laser assembly 500 includes the laser chips 504A and 504B. The laser chips 504A and 504B generate a large amount of heat during operation, and are main heat sources of the optical module 200. The first gap 30215 and the second gap 30216 may effectively block horizontal transfer of the heat from the second region 30212 to the first region 30211 and the third region 30213. As will be mentioned later, the heat generated by the laser chips 504A and 504B is mainly vertically transmitted to the upper shell 201 of the optical module 200 by means of the upper box 501.

Figure 8C:
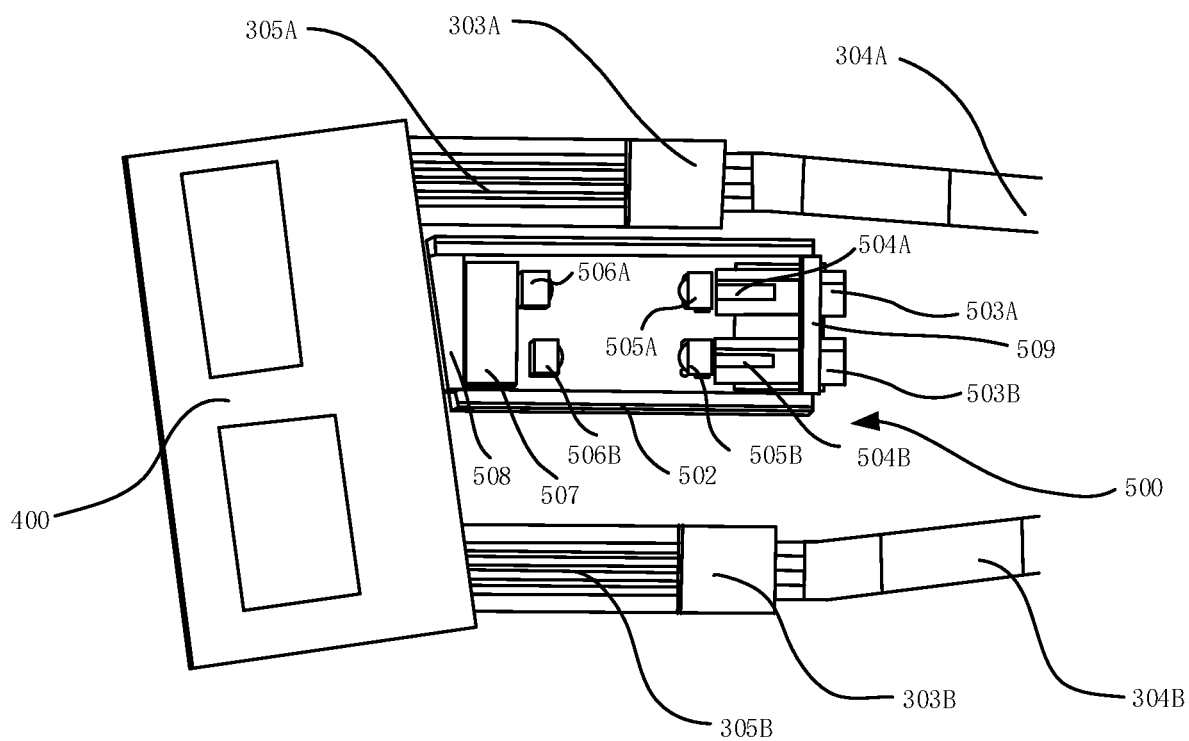
FIG. 8C is a schematic diagram showing an assembly relationship between a silicon optical chip and a laser assembly in an optical module, in accordance with some embodiments.

As further shown in FIGS. 8A to 8C, the conductive substrates 503A and 503B include a first conductive substrate 503A and a second conductive substrate 503B. The laser chips 504A and 504B include a first laser chip 504A and a second laser chip 504B. The first laser chip 504A is disposed on the first conductive substrate 503A, and the second laser chip 504B is disposed on the second conductive substrate 503B. In FIG. 8B, the first laser chip 504A is disposed on a surface of the first conductive substrate 503A close to the lower box 502, and the second laser chip 504B is disposed on a surface of the second conductive substrate 503B close to the lower box 502. The first laser chip 504A and the second laser chip 504B are invisible since they are blocked by the first conductive substrate 503A and the second conductive substrate 503B. In some embodiments, there may be only one conductive substrate, and the first laser chip 504A and the second laser chip 504B are disposed on a same conductive substrate.

The laser assembly 500 further includes a first collimating lens 505A, a second collimating lens 505B, a first focusing lens 506A, a second focusing lens 506B, and an isolator 507. The first laser chip 504A and the second laser chip 504B, the first collimating lens 505A and the second collimating lens 505B, the first focusing lens 506A and the second focusing lens 506B, and the isolator 507 are all located in the relatively closed cavity formed by the upper box 501, the lower box 502, the light transmitting member 508, and the at least one blocking member 509 or 510. Moreover, the first collimating lens 505A and the second collimating lens 505B, the first focusing lens 506A and the second focusing lens 506B, and the isolator 507 are all disposed on the lower box 502.

The first collimating lens 505A, the first focusing lens 506A, the isolator 507 and the light transmitting member 508 are sequentially arranged in a light exit direction of the first laser chip 504A; and the second collimating lens 505B, the second focusing lens 506B, the isolator 507 and the light transmitting member 508 are sequentially arranged in a light exit direction of the second laser chip 504B. Two light beams respectively emitted by the two laser chips 504A and 504B share one isolator 507 and one light transmitting member 508; and of course, in some embodiments, one isolator and one light transmitting member may be separately provided for a single light beam emitted by each laser chip, that is, the laser assembly 500 includes two isolators and two light transmitting members.

It will be noted that, a layout of the elements inside the laser assembly 500 is not limited to the sequential arrangement of the first collimating lens 505A, the first focusing lens 506A, the isolator 507 and the light transmitting member 508 in the light exit direction of the first laser chip 504A, and the sequential arrangement of the second collimating lens 505B, the second focusing lens 506B, the isolator 507 and the light transmitting member 508 in the light exit direction of the second laser chip 504B. In some embodiments, as shown in FIGS. 12B to 12C, positions of the first focusing lens 506A and the isolator 507 in the laser assembly 500 are interchanged, and positions of the second focusing lens 506B and the isolator 507 in the laser assembly 500 are interchanged. That is to say, in FIGS. 12B to 12C, the first collimating lens 505A, the isolator 507, the first focusing lens 506A and the light transmitting member 508 are sequentially arranged in the light exit direction of the first laser chip 504A; and the second collimating lens 505B, the isolator 507, the second focusing lens 506B and the light transmitting member 508 are sequentially arranged in the light exit direction of the second laser chip 504B.

As shown in FIGS. 8A to 8C, the light exit direction of the first laser chip 504A is parallel to the axial direction A of the laser assembly 500, a single light beam emitted by the first laser chip 504A is in a divergent state, and is converged by the first collimating lens 505A to form collimated parallel light, and a parallel light may travel for a long distance with low loss to meet requirements of optical path design and structural design; and the first focusing lens 506A converges the collimated parallel light into converged light, and the converged light reduces an area of a light spot of the single light beam, and concentrates energy of the single light beam, which is conductive to improving efficiency of the optical coupling between the laser assembly 500 and waveguides in the silicon optical chip 400.

Similarly, the light exit direction of the second laser chip 504B is parallel to the axial direction A of the laser assembly 500, a single light beam emitted by the second laser chip 504B is in a divergent state, and is converged by the second collimating lens 505B to form collimated parallel light, and a parallel light may travel for a long distance with low loss to meet the requirements of optical path design and structural design; and the second focusing lens 506B converges the collimated parallel light into converged light, and the converged light reduces an area of a light spot of the single light beam, and concentrates energy of the single light beam, which is conductive to improving efficiency of the optical coupling between the laser assembly 500 and the silicon optical chip.

The first laser chip 504A and the second laser chip 504B emit two light beams, respectively, with a same or similar wavelength and without carrying signals. The two light beams with the same or similar wavelength and the same or similar intensity are modulated respectively by the Mach-Zehnder interferometer in the silicon optical chip 400.

It can be seen from the above that, the light emitted by the first laser chip 504A is directed toward the first focusing lens 506A after being collimated by the first collimating lens 505A, then is directed toward the isolator 507 through the first focusing lens 506A, then is directed toward the light transmitting member 508 through the isolator 507, and finally exits from the laser assembly 500. By adjusting the first focusing lens 506A, a direction in which the light finally exits may be changed. Similarly, the light emitted by the second laser chip 504B is directed toward the second focusing lens 506B after being collimated by the second collimating lens 505B, then is directed toward the isolator 507 through the second focusing lens 506B, then is directed toward the light transmitting member 508 through the isolator 507, and finally exits from the laser assembly 500. By adjusting the second focusing lens 506B, a direction in which the light finally exits may be changed.

By adjusting the first focusing lens 506A and the second focusing lens 506B, the directions in which the two light beams finally exit may be separately adjusted, which facilitates to separately achieve the optical coupling of the two light beams between the laser assembly 500 and the silicon optical chip 400. Therefore, in some embodiments, the laser assembly 500 does not include the first collimating lens 505A and the second collimating lens 505B, and adjusts the directions in which the two light beams finally exit only by means of the first focusing lens 506A and the second focusing lens 506B.

It will be noted that, the adjustment of the first focusing lens 506A and the second focusing lens 506B generally needs to be performed after the first laser chip 504A and the second laser chip 504B are energized to emit light. However, as shown in FIG. 8B, since the conductive substrates 503A and 503B are disposed on the upper box 501 through the second blocking member 510, and the laser chips 504A and 504B are disposed on surfaces of the conductive substrates 503A and 503B away from the upper box 501, there is a need to directly or indirectly arrange the laser chips 504A and 504B, the conductive substrates 503A and 503B, and the second blocking member 510 on the upper box 501 first, and then assemble the upper box 501 with the lower box 502. In this way, before the upper box 501 and the lower box 502 are assembled, the optical path of the laser assembly 500 is not completely formed, and the laser chips 504A and 504B cannot be energized to emit light; and after the upper box 501 and the lower box 502 are assembled, the positions of the first focusing lens 506A and the second focusing lens 506B in the laser assembly 500 cannot be moved.

Figure 11:
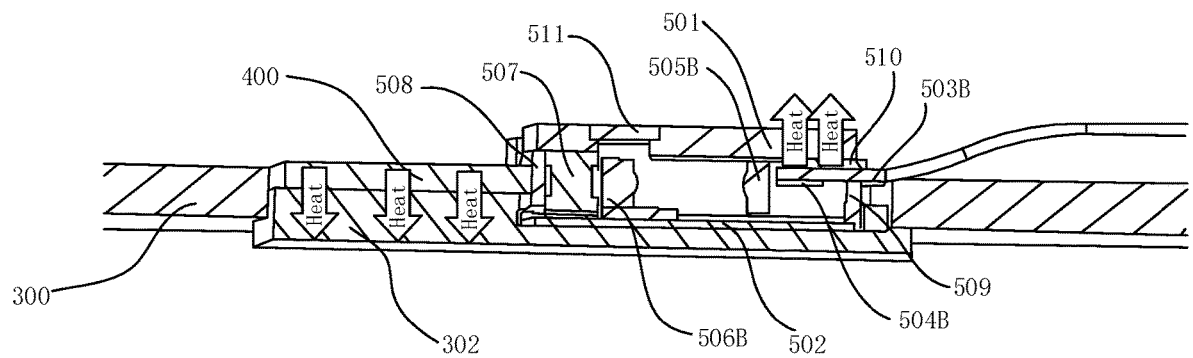
FIG. 11 is a portion sectional view of an optical module, in accordance with some embodiments.

Based on this, as shown in FIGS. 8B and 11, the upper box 501 of the laser assembly 500 includes an adjustment through hole 512, and the first focusing lens 506A and the second focusing lens 506B are below the adjustment through hole 512. That is, an orthogonal projection of the adjustment through hole 512 on the base 302 at least partially covers orthogonal projections of the first focusing lens 506A and the second focusing lens 506B on the base 302.

In this way, after the upper box 501 and the lower box 502 are assembled, the laser chips 504A and 504B are energized to emit light, and an adjustment tool outside the laser assembly 500 may extend into the laser assembly 500 through the adjustment through hole 512, so as to adjust the positions of the first focusing lens 506A and the second focusing lens 506B. For example, the positions or angles of the first focusing lens 506A and the second focusing lens 506B are changed to change positions where the light beams exit, so that the light beams are aligned with a waveguide corresponding to the second optical waveguide end facet 402 on the light incident surface 404 of the silicon optical chip 400.

In a case where the upper box 501 of the laser assembly 500 includes the adjustment through hole 512, in order to achieve enclosing of the laser assembly 500, in some embodiments, the laser assembly 500 further includes a block 511, which may block the adjustment through hole 512.

In addition, in order to adjust heights of the focusing lenses, in some embodiments, a spacer block 513 is disposed between the first focusing lens 506A and the lower box 502 and between the second focusing lens 506B and the lower box 502.

The isolator 507 receives the light from the first focusing lens 506A and the second focusing lens 506B, and allows the light to pass in a single direction and cut off in an opposite direction. That is, the isolator 507 allows the light to enter the silicon optical chip 400 from the laser assembly 500, but does not allow the light to enter the laser assembly 500 from the silicon optical chip 400. Therefore, the isolator 507 functions to isolate the light, and prevents the light from being reflected back into the laser chips 504A and 504B.

The light beam emitted by the laser assembly 500 enters the silicon optical chip 400. In order to prevent the light beam from being reflected when entering the silicon optical chip 400, in turn to reduce loss of optical power caused by the reflection, it is required that the light beam should enter the silicon optical chip 400 at an angle that is not perpendicular to the light incident surface 404 of the silicon optical chip 400.

In some embodiments, the light exit direction of the laser assembly 500 is changed depending on a structure of the light transmitting member 508, so as to meet the requirements of the silicon optical chip 400 for a light incident angle. As shown in FIGS. 8A and 8B, for example, the light transmitting member 508 is a hexahedron and includes two non-parallel but opposite side faces 5081 and 5082, one side face 5081 is a light incident surface, and another side face 5082 is a light exit surface; and it can be understood that, the light exit surface 5082 of the light transmitting member 508 and the light exit surface 520 of the laser assembly 500 are a same light exit surface. The light incident surface 5081 and the light exit surface 5082 of the light transmitting member 508 are not parallel, that is, they form an included angle of not 0°, and the light exit surface 5082 of the light transmitting member 508 is significantly inclined with respect to the light incident surface 5081.

Figure 9:
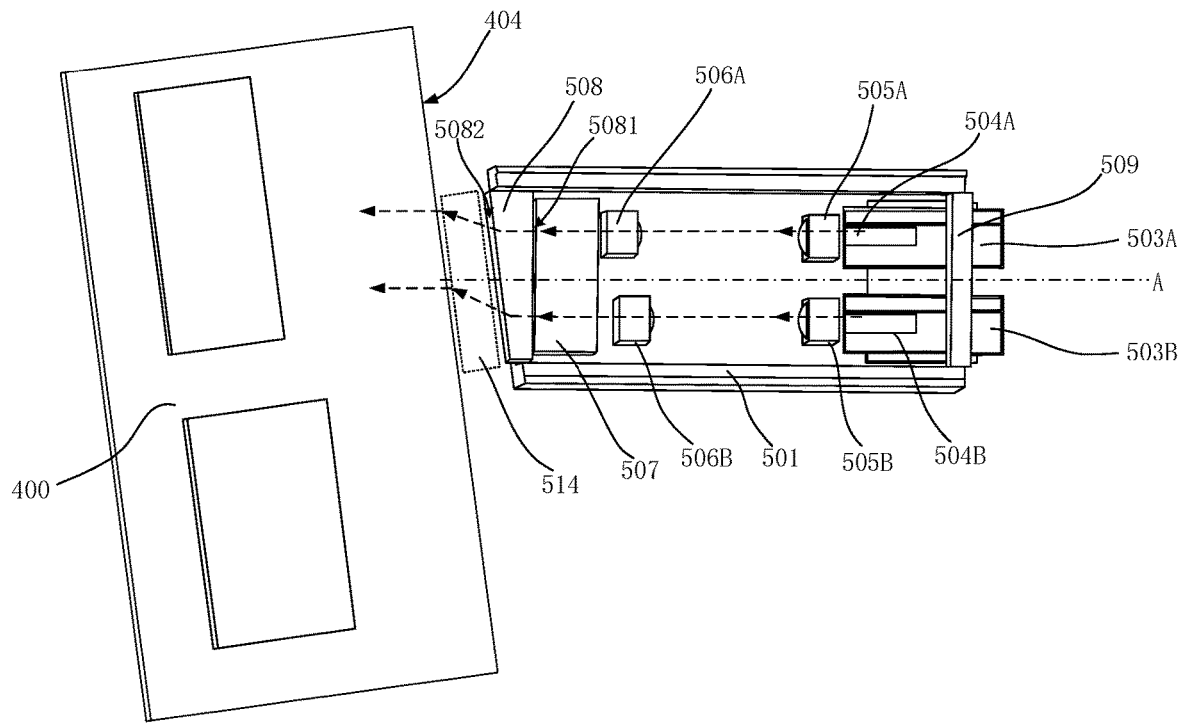
FIG. 9 is a schematic diagram of an optical path between a laser assembly and a silicon optical chip in an optical module, in accordance with some embodiments.

As shown in FIG. 9, the light beams enter the light transmitting member 508 at an angle perpendicular to the light incident surface 5081 of the light transmitting member 508, then are refracted at the light exit surface 5082, and then are refracted again by the light incident surface 404 of the silicon optical chip 400, so as to meet the requirements of the silicon optical chip 400 for a light incident angle. It will be noted that, inside the laser assembly 500, the directions of the light emitted by the laser chips 504A and 504B may or may not be changed during the light's travel. In FIG. 9, the light incident surface 5081 of the light transmitting member 508 is perpendicular to the light exit directions of the laser chips 504A and 504B, and the directions of the light emitted by the laser chips 504A and 504B are not changed during its travel to the light transmitting member 508.

The light incident surface 5081 and the light exit surface 5082 of the light transmitting member 508 are not parallel, so that after the light enters into the light incident surface 5081 of the light transmitting member 508 and exits out of the light exit surface 5082, the propagation direction of the light is aligned with the second optical waveguide end facet 402 of the silicon optical chip 400. Since the light transmitting member 508 is an element through which the light beam inevitably passes, and is an element through which the light beam finally passes in the laser assembly 500, the use of the light transmitting member 508 to change the transmission direction of the light may relatively simply meet the requirements of the silicon optical chip 400 for a light incident angle.

In FIG. 9, the light emitted by the second laser chip 504B is perpendicular to a light exit surface of the second laser chip 504B, and is parallel to the axial direction A of the laser assembly 500; the light incident surface 5081 of the light transmitting member 508 is perpendicular to the propagation direction of the light emitted by the second laser chip 504B, and the light emitted by the second laser chip 504B is directed toward the light incident surface 5081 of the light transmitting member 508 in an initial propagation direction, and reaches the light exit surface 5082 of the light transmitting member 508 in the initial propagation direction; the light is refracted at the light exit surface 5082 of the light transmitting member 508, and the refracted light enters a gap between the light transmitting member 508 and the silicon optical chip 400, and reaches the light incident surface 404 of the silicon optical chip 400; and the light enters the silicon optical chip 400 after being refracted again at the light incident surface 404 of the silicon optical chip 400.

Figure 10A:
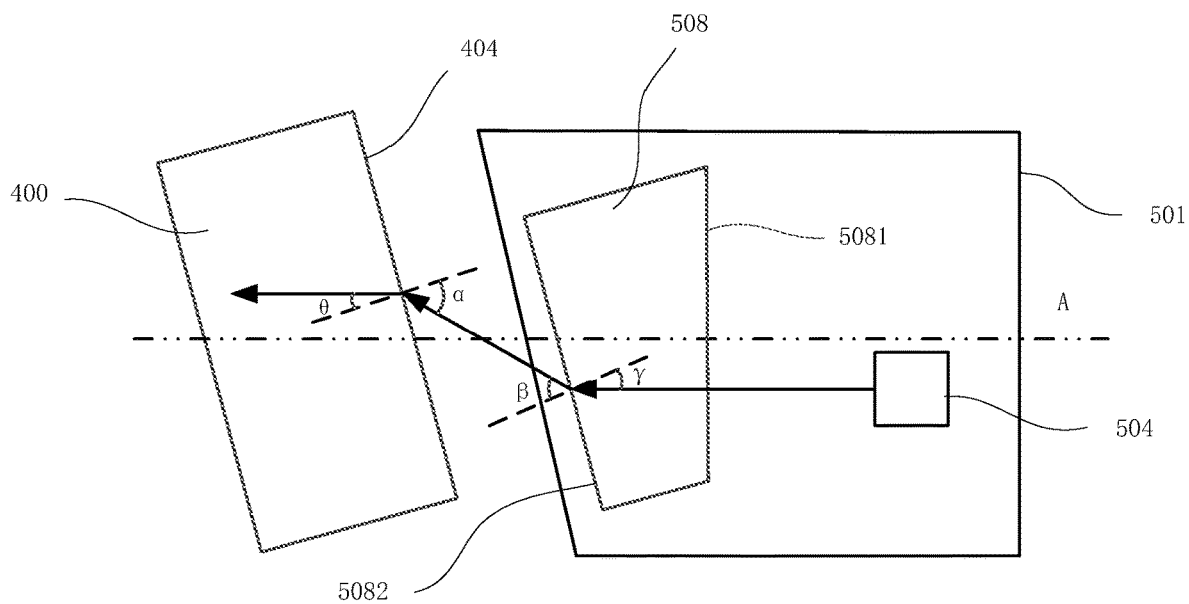
FIG. 10A is a simplified schematic diagram of the optical path shown in FIG. 9.

FIG. 10A is a simplified schematic diagram of the optical path shown in FIG. 9. Only the lower box 502, the second laser chip 504B, the light transmitting member 508 and the silicon optical chip 400 are shown in FIG. 10A. The optical path shown in FIG. 10A is the same as the optical path shown in FIG. 9. As shown in FIG. 10A, the light exit surface of the second laser chip 504B is parallel to the light incident surface 5081 of the light transmitting member 508, the light exit surface 5082 of the light transmitting member 508 is parallel to the light incident surface 404 of the silicon optical chip 400, and the light incident surface 5081 and the light exit surface 5082 of the light transmitting member 508 are not parallel. The light emitted by the second laser chip 504B is not refracted at the light incident surface 5081 of the light transmitting member 508, but is refracted for a first time at the light exit surface 5082 of the light transmitting member 508, and is refracted for a second time at the light incident surface 404 of the silicon optical chip 400. In some embodiments, a refractive index of the material of the silicon optical chip 400 is equal to or similar to a refractive index of the material of the light transmitting member 508. As a result, the light is refracted for the first time at the light exit surface 5082 of the light transmitting member 508, and then is refracted for the second time at the light incident surface 404 of the silicon optical chip 400, which is equivalent to that the light enters medium B (the gap between the light transmitting member 508 and the silicon optical chip 400) from medium A (the light transmitting member 508), and then enters the medium A (the silicon optical chip 400) from the medium B. Thus, an incident angle $\alpha$ of the light at the medium A (the silicon optical chip 400) is equal to a refraction angle $\beta$ of the light in the medium B.

The silicon optical chip 400 generally requires that the light should be directed toward the light incident surface 404 of the silicon optical chip 400 at an incident angle $\alpha$ of 11.6° ($\alpha$=11.6°), and a refraction angle $\theta$ after the light enters the silicon optical chip 400 should be 8°. As shown in FIG. 10A, this requires that an included angle $\gamma$ between the light exit direction of the second laser chip 504B and a normal line of the light exit surface 5082 of the light transmitting member 508 should be equal to 8° ($\gamma$=8°). That is, the light emitted by the second laser chip 504B is directed toward the light exit surface 5082 of the light transmitting member 508 at an incident angle $\gamma$ of 8° ($\gamma$=8°).

It will be understood that, if the light emitted by the second laser chip 504B is directly directed toward the light incident surface 404 of the silicon optical chip 400 without passing through the light transmitting member 508, the light emitted by the second laser chip 504B needs to be directed toward the light incident surface 404 of the silicon optical chip 400 at the incident angle of 11.6°. After the light transmitting member 508 is used in the laser assembly 500, the incident angle at which the light emitted by the second laser chip 504B is directed toward the light incident surface 404 of the silicon optical chip 400 may be changed from 11.6° to 8°, so that an angle of the light exit direction of the second laser chip 504B with respect to the silicon optical chip 400 is decreased, and the refraction is more favorable for maintaining a shape of a light spot of the light emitted by the second laser chip 504B than the reflection, so it is possible to facilitate to improve the efficiency of the optical coupling between the laser assembly 500 and the silicon optical chip 400.

It can be understood that, the same is true for the optical path of the first laser chip 504A.

In the optical path shown in FIGS. 9 and 10A, the light exit direction of the second laser chip 504B is parallel to the axial direction A of the laser assembly 500, which facilitates manufacture of the laser assembly 500 and the optical module 200.

Figure 10B:
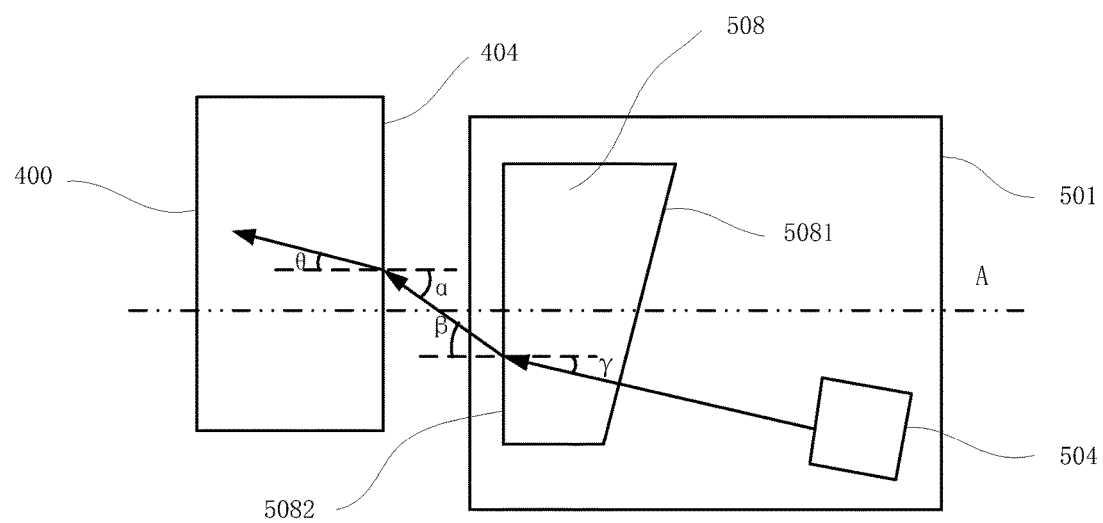
FIG. 10B is a simplified schematic diagram of another optical path different from the optical path shown in FIG. 9.

FIG. 10B is a simplified schematic diagram of another optical path different from the optical path shown in FIG. 9. Only the lower box 502, the second laser chip 504B, the light transmitting member 508 and the silicon optical chip 400 are shown in FIG. 10B. As shown in FIG. 10B, the light exit surface of the second laser chip 504B is parallel to the light incident surface 5081 of the light transmitting member 508, the light exit surface 5082 of the light transmitting member 508 is parallel to the light incident surface 404 of the silicon optical chip 400, and the light incident surface 5081 and the light exit surface 5082 of the light transmitting member 508 are not parallel; the light emitted by the second laser chip 504B is perpendicular to the light exit surface of the second laser chip 504B, and is not parallel to the axial direction A of the laser assembly 500; the light emitted by the second laser chip 504B is not refracted at the light incident surface 5081 of the light transmitting member 508, but is directed toward the light incident surface 5081 of the light transmitting member 508 in the initial propagation direction, and reaches the light exit surface 5082 of the light transmitting member 508 in the initial propagation direction; the light emitted by the second laser chip 504B is refracted for the first time at the light exit surface 5082 of the light transmitting member 508, and the light refracted for the first time enters the gap between the light transmitting member 508 and the silicon optical chip 400, and reaches the light incident surface 404 of the silicon optical chip 400; and the light enters the silicon optical chip 400 after being refracted for the second time at the light incident surface 404 of the silicon optical chip 400.

By rotating the second laser chip 504B, the light transmitting member 508 and the silicon optical chip 400 in FIG. 10A clockwise by a certain angle, the optical path shown in FIG. 10B may be obtained. This angle may be, for example, the incident angle $\gamma$ at which the light emitted by the second laser chip 504B is directed toward the light exit surface 5082 of the light transmitting member 508, and for example, $\gamma$ is equal to 8° ($\gamma$=8°). Similarly, by rotating the second laser chip 504B, the light transmitting member 508 and the silicon optical chip 400 in FIG. 10B counterclockwise by a certain angle, the optical path shown in FIG. 10A may be obtained.

In some embodiments, as shown in FIG. 9, an optical glue 514 fills a gap between the light exit surface 5082 of the light transmitting member 508 and the light incident surface 404 of the silicon optical chip 400, so that no air exists in the gap between the light exit surface 5082 of the light transmitting member 508 and the light incident surface 404 of the silicon optical chip 400. The light directly enters the optical glue 514 after exiting from the light transmitting member 508, thereby preventing the light from scattering in the gap between the light exit surface 5082 of the light transmitting member 508 and the light incident surface 404 of the silicon optical chip 400 due to existence of dust in the gap. In addition, by filling the gap with the optical glue 514, it is possible to prevent the light exit surface 5082 of the light transmitting member 508 and the light incident surface 404 of the silicon optical chip 400 from being contaminated, and reliability of the product may be improved.

A refractive index of the optical glue 514 is greater than or equal to the refractive index of waveguides in the silicon optical chip 400, and is less than or equal to the refractive index of the light transmitting member 508. Generally speaking, a relationship among refractive indexes is that a refractive index of gas is less than a refractive index of liquid, and the refractive index of the liquid is less than a refractive index of solid (gas<liquid<solid). Therefore, the refractive index of the optical glue 514 is generally greater than a refractive index of air. For example, the refractive index of the air is 1, the refractive index of the silicon optical chip 400 is 1.46, the refractive index of the light transmitting member 508 is 1.53, and the refractive index of the optical glue 514 may be greater than or equal to 1.46 and less than or equal to 1.53. For example, the refractive index of the optical glue 514 is 1.46, 1.47, 1.48, 1.49, 1.50, 1.51, 1.52, or 1.53. A material of the optical glue 514 may be epoxy resin.

In daily use, the optical module 200 has a need for heat dissipation. It is known that, the laser chips 504A and 504B in the laser assembly 500 generate a large amount of heat during operation, and the heat may increase a temperature in a working environment of the laser chips 504A and 504B, and a high temperature in the working environment may cause power of the laser chips 504A and 504B to decrease and cause the wavelength of the light beams generated by the laser chips 504A and 504B to shift. To this end, there is a need to provide heat dissipation for the laser chips 504A and 504B.

In some embodiments, since the upper shell 201 of the optical module 200 is closer to the heat sink 107 on the cage 106 than the lower shell 202 of the optical module 200, conducting the heat inside the optical module 200 to the upper shell 201 may achieve heat dissipation at higher efficiency than conducting the heat inside the optical module 200 to the lower shell 202.

Based on this, as shown in FIGS. 5A to 5B, 8B and 11, the upper box 501 of the laser assembly 500 is in thermal conductive contact with the upper shell 201 of the optical module 200, the second conductive substrate 503B is disposed on an inner surface of the upper box 501 facing the base 302 through the second blocking member 510, and the second laser chip 504B is disposed on the surface of the second conductive substrate 503B away from the upper box 501. In this way, the heat generated by the second laser chip 504B is conducted to the upper box 501 of the laser assembly 500 through the second conductive substrate 503B, and then is conducted to the upper shell 201 of the optical module 200 through the upper box 501 of the laser assembly 500, so that the heat generated by the second laser chip 504B is dissipated from the upper shell 201. It can be understood that, the same is true for the dissipation of the heat of the first laser chip 504A. In addition, the second blocking member 510 between the second conductive substrate 503B and the upper box 501 is not necessary, and whether the second blocking member 510 needs to be used may be determined according to heat dissipation requirements and enclosing requirements of the laser assembly 500.

It can be seen from FIGS. 5A to 5B that, in a case where the outer surface of the laser assembly 500 is provided with the first heat conduction pad 207, and the upper shell 201 of the optical module 200 includes the first heat conduction column 2013, heat in the upper box 501 of the laser assembly 500 may be conducted to the upper shell 201 of the optical module 200 through the first heat conduction pad 207 and the first heat conduction column 2013.

In addition, in some embodiments, the circuit board 300 has the through hole 302a penetrating the upper and lower surfaces of the circuit board 300, and the base 302 is located in the through hole 302a. In a case where the surface of the base 302 away from the silicon optical chip 400 and the laser assembly 500 is in thermal contact with the lower shell 202 of the optical module 200, the heat generated by the silicon optical chip 400 is mainly dissipated to the lower shell 202 of the optical module 200 through the base 302.

Therefore, the heat generated by the laser assembly 500 is mainly dissipated through the upper shell 201 of the optical module 200, and the heat generated by the silicon optical chip 400 is mainly dissipated through the lower shell 202 of the optical module 200, so that the heat of the silicon optical chip 400 and the laser assembly 500 is prevented from being concentrated on a same side of the optical module 200, upper and lower sides of the optical module 200 are fully utilized for heat dissipation, and the heat dissipation efficiency is improved.

It can be seen from FIGS. 5A to 5B that, in a case where the silicon optical chip 400 is provided with the transimpedance amplifier 410 and the modulator driver 420, the second heat conduction pad 208 is disposed on the side of the transimpedance amplifier 410 and the modulator driver 420 that is away from the silicon optical chip 400, and the upper shell 201 of the optical module 200 includes the second heat conduction column 2014, the heat in the transimpedance amplifier 410 and the modulator driver 420 may be conducted to the upper shell 201 of the optical module 200 through the second heat conduction pad 208 and the second heat conduction column 2014.

As shown in FIGS. 12B to 12C, in a case where the laser assembly 500 does not include the lower box 502, the heat generated by the laser assembly 500 may also be dissipated to the lower shell 202 of the optical module 200 through the base 302.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical module, comprising:
   a shell;
   a circuit board, wherein the circuit board is located within the shell;
   a base, wherein the base is located on the circuit board or in a through hole of the circuit board;
   a laser assembly, wherein the laser assembly is located on the base and electrically connected to the circuit board, and is configured to provide first light;
   a silicon optical chip, wherein the silicon optical chip is located on the base, electrically connected to the circuit board and optically connected to the laser assembly, and is configured to receive the first light, and modulate the first light to form a first optical signal; and
   a protective cover, wherein the protective cover covers on the circuit board; the laser assembly and a wiring region of the laser assembly are encapsulated between the protective cover and the circuit board, and the protective cover is configured to protect electrical connection wires between the laser assembly and the circuit board; and/or, the silicon optical chip and a wiring region of the silicon optical chip are encapsulated between the protective cover and the circuit board, and the protective cover is configured to protect electrical connection wires between the silicon optical chip and the circuit board; wherein
   the shell includes at least one heat conduction column, the at least one heat conduction column is disposed on an inner wall of the shell and is in thermal conductive connection with the laser assembly and/or the silicon optical chip, and each heat conduction column is configured to conduct the heat inside the shell to the shell; and
   the protective cover includes at least one escape opening that allow the at least one heat conduction column to pass and enter an inside of the protective cover.

2. The optical module according to claim 1, wherein the at least one heat conduction column includes a first heat conduction column, the at least one escape opening includes a first escape opening, and the first heat conduction column passes through the first escape opening to be in thermal conductive connection with the laser assembly; and/or
the at least one heat conduction column includes a second heat conduction column, the at least one escape opening includes a second escape opening, and the second heat conduction column passes through the second escape opening to be in thermal conductive connection with the silicon optical chip.

3. The optical module according to claim 2, wherein the first escape opening includes a first inclined surface, the first inclined surface is located at an edge of an inner wall of the first escape opening, and a sectional area of the first escape opening increases in a direction of an axis of the first escape opening and away from the circuit board; and/or
the second escape opening includes a second inclined surface, the second inclined surface is located at an edge of an inner wall of the second escape opening, and a sectional area of the second escape opening increases in a direction of an axis of the second escape opening and away from the circuit board.

4. The optical module according to claim 2, wherein an orthogonal projection of the first heat conduction column on the circuit board and an orthogonal projection of the laser assembly on the circuit board are at least partially overlapped; and/or
an orthogonal projection of the second heat conduction column on the circuit board and an orthogonal projection of the silicon optical chip on the circuit board are at least partially overlapped.

5. The optical module according to claim 4, wherein the orthogonal projection of the first heat conduction column on the circuit board is greater than or equal to the orthogonal projection of the laser assembly on the circuit board; and/or
the orthogonal projection of the second heat conduction column on the circuit board may be greater than or equal to the orthogonal projection of the silicon optical chip on the circuit board.

6. The optical module according to claim 2, wherein a bottom of the edge of the inner wall of the first escape opening in the protective cover compresses the laser assembly; and/or
a bottom of the edge of the inner wall of the second escape opening compresses the silicon optical chip.

7. The optical module according to claim 2, wherein the silicon optical chip is further configured to receive a second optical signal from an outside of the optical module;
the optical module further comprising:
a transimpedance amplifier, wherein the transimpedance amplifier is disposed on the silicon optical chip, and is configured to convert a current signal generated by the silicon optical chip based on the second optical signal into a differential voltage and transmit the differential voltage to the circuit board, so as to extract data in the second optical signal from the outside of the optical module; and
a modulator driver, wherein the modulator driver is disposed on the silicon optical chip, and is configured to amplify a first electrical signal from the circuit board and transmit the first electrical signal to the silicon optical chip, so as to covert the first electrical signal into the first optical signal.

8. The optical module according to claim 7, wherein the second heat conduction column passes through the second escape opening to be in thermal conductive connection with the transimpedance amplifier and the modulator driver.

9. The optical module according to claim 8, wherein a bottom of the edge of the inner wall of the first escape opening in the protective cover compresses the laser assembly; and/or
a bottom of the edge of the inner wall of the second escape opening compresses the silicon optical chip by compressing the transimpedance amplifier and the modulator driver.

10. The optical module according to claim 7, wherein the shell includes an upper shell and a lower shell, the upper shell includes the first heat conduction column and the second heat conduction column, and the laser assembly and the silicon optical chip are disposed on a side of the circuit board close to the upper shell.

11. The optical module according to claim 10, wherein the transimpedance amplifier and the modulator driver are disposed on an outer surface of the silicon optical chip proximate to the upper shell.

12. The optical module according to claim 10, further comprising:
a first heat conduction pad disposed on an outer surface of the laser assembly proximate to the upper shell; and
a second heat conduction pad disposed on a side of the transimpedance amplifier and a side of the modulator driver that are away from the silicon optical chip; wherein
a free end of the first heat conduction column is in contact connection with the laser assembly through the first heat conduction pad, and a free end of the second heat conduction column is in contact connection with the transimpedance amplifier and the modulator driver through the second heat conduction pad.

13. The optical module according to claim 12, wherein the first heat conduction pad is made of a thermally conductive adhesive, and the second heat conduction pad is made of a thermally conductive adhesive.

14. The optical module according to claim 10, wherein a sectional area of a free end of the first heat conduction column is smaller than that of a fixed end of the first heat conduction column at a contact position between the first heat conduction column and the upper shell, and a sectional area of the first heat conduction column increases from the free end of the first heat conduction column to the fixed end of the first heat conduction column; and
a sectional area of a free end of the second heat conduction column is smaller than that of a fixed end of the second heat conduction column at a contact position between the second heat conduction column and the upper shell, and a sectional area of the second heat conduction column increases from the free end of the second heat conduction column to the fixed end of the second heat conduction column.

15. The optical module according to claim 14, wherein the first heat conduction column and the second heat conduction column are in a shape of a truncated cone or a truncated pyramid.

16. The optical module according to claim 10, wherein the first heat conduction column and the second heat conduction column are integrally formed with the upper shell.

17. The optical module according to claim 7, wherein the shell includes an upper shell and a lower shell, the lower shell includes the first heat conduction column and the second heat conduction column, and the laser assembly and the silicon optical chip are disposed on a side of the circuit board close to the lower shell.

18. The optical module according to claim 1, wherein the protective cover is bonded to the circuit board through a glue.

19. The optical module according to claim 1, further comprising fixing pins, wherein the protective cover is fixedly connected to the circuit board through the fixing pins.

20. The optical module according to claim 1, wherein the circuit board includes fixing holes, the protective cover includes via holes, and the fixing pins pass through the via holes to be fitted with the fixing holes to fix the protective cover on the circuit board.

* * * * *